United States Patent [19]
Brody et al.

[11] Patent Number: 6,120,820
[45] Date of Patent: Sep. 19, 2000

[54] METHOD OF MODIFYING THE COLOR OF A DAIRY MATERIAL

[75] Inventors: Ernest P. Brody, Minneapolis; Richard Janita, Shoreview; John T. Perry, Jr., Fridley, all of Minn.

[73] Assignee: Land O'Lakes, Inc., Arden Hills, Minn.

[21] Appl. No.: 09/255,545

[22] Filed: Feb. 22, 1999

[51] Int. Cl.[7] .............................. A23D 21/00; A23L 1/277
[52] U.S. Cl. ........................ 426/253; 426/257; 426/258; 426/262; 426/268; 426/583; 426/656; 426/657; 426/478; 426/490; 426/491
[58] Field of Search ..................................... 426/253, 257, 426/258, 262, 268, 583, 656, 657, 478, 490, 491

[56] References Cited

U.S. PATENT DOCUMENTS

| | | | |
|---|---|---|---|
| 4,888,184 | 12/1989 | Bottomley et al. | 426/41 |
| 5,338,553 | 8/1994 | Johnson et al. | 426/36 |
| 5,409,726 | 4/1995 | Stanley et al. | 426/573 |
| 5,420,249 | 5/1995 | de Wit et al. | 530/366 |
| 5,447,731 | 9/1995 | Pedersen et al. | 426/36 |
| 5,575,916 | 11/1996 | Brian et al. | 210/634 |
| 5,674,548 | 10/1997 | Nakamura et al. | 426/598 |
| 5,679,780 | 10/1997 | Jensen et al. | 530/414 |
| 5,691,165 | 11/1997 | Nielsen et al. | 435/68.1 |
| 5,747,031 | 5/1998 | Ruch et al. | 424/130.1 |
| 5,747,647 | 5/1998 | Stack et al. | 530/365 |

OTHER PUBLICATIONS

"Reactions of Benzoyl Peroxide with Whey" by J.E. Change et al, *Journal of Dairy Science,* vol. 60, No. 1, Jan. 1977, pp. 40–44.

*Primary Examiner*—Milton Cano
*Attorney, Agent, or Firm*—Kinney & Lange

[57] ABSTRACT

A method of producing a reduced color dairy product that includes separating a dairy material into a first portion and a second portion, the first portion including at least about 30 weight percent, as determined by high pressure liquid chromatography at a detection wavelength of 280 nanometers, of the native and soluble protein from the dairy material and the second portion including at least about 50 weight percent of the coloring agent from the dairy material, and partially or fully deactivating at least some of the coloring agent present in the second portion.

41 Claims, 14 Drawing Sheets

METHOD OF MODIFYING THE COLOR OF A DAIRY MATERIAL

BACKGROUND OF THE INVENTION

The present invention generally relates to a method of removing one or more color constituents from a dairy material, such as a whey material, to produce a reduced color dairy product, such as a reduced color whey product. More specifically, the present invention relates to a method of processing a dairy material, such as a whey material, to produce a reduced color whey product by separating a coloring agent from the whey material and optionally deactivating the coloring agent.

More than 140 million tons of fluid whey is produced worldwide annually. Coagulation of milk, such as whole milk, yields solid curds and a watery portion that is commonly referred to as fluid whey. Fluid whey is an opaque, greenish-yellow fluid that typically contains about 5 to 7 weight percent total solids and 90 weight percent or more water. The solids includes fats, soluble and insoluble proteins, carbohydrates, and ash.

Fluid whey has a very high biological oxygen demand (BOD). Because of the high BOD, disposal of fluid whey by application to land or in water courses, such as creeks and rivers, is typically illegal in most civilized countries. Furthermore, treatment of fluid whey in wastewater treatment plants to reduce the BOD level is relatively expensive. The inherent difficulties that fluid whey disposal creates have resulted in development of processing techniques that render the fluid whey, or components of the fluid whey, useful in preparing food products for human and animal consumption.

The protein portion of whey materials, such as fluid whey and whey protein concentrate, is a high value food component and additive. However, during the production of certain types of dairy products, such as cheddar, Colby, and Cheshire cheeses, coloring agents, such as dyes and extracts, are typically added for purposes of providing the dairy product, such as cheddar cheese, with a particular color. The coloring agent may be added because the colored food product is viewed as having desirable characteristics by the consuming public by virtue of the color. Also, certain dairy products, such as cheddar cheese, may be provided with a particular color to create a particular grade or style of product that is capable of being readily recognized by the consuming public. As an example, annatto extract, a natural coloring material derived from the bixo orellena fruit, is typically added during the manufacture of certain types of cheese to give the cheese a color which the consumer has come to expect and accept. Other non-exhaustive examples of food coloring agents that are added or could be added for purposes of colorizing dairy products include β-carotene, apo-8-carotenal, canthaxanthin, paprika oleoresin, turmeric, and beet extract.

However, though the addition of coloring agents to give particular dairy products particular colors is beneficial and, indeed very important, for purposes of marketing the product to the consuming public, there is an undesirable consequence due to this coloring agent addition. Specially, byproduct whey materials that remain following production of the initial dairy product retain some amount of the coloring agent and are thereby colorized. As noted above, these byproduct whey materials are typically processed for purposes of making an additional product out of the whey material or components of the whey material.

The coloring agent in the byproduct whey materials causes products that are based on the byproduct whey materials to be colorized. In many cases, this is undesirable. For example, when byproduct whey material is further processed to form baby formula, the purchasers of baby formula may not buy the baby formula if the baby formula is based upon whey material containing annatto extract and is consequently colored orange. In essence, though a color may be beneficial or desired for one particular type of dairy product, it may be highly undesirable for another dairy product based upon byproduct whey material to have the color of the initial dairy product. Therefore, while there is value to adding coloring agents to some dairy products, there is likewise value to removing coloring agents from byproduct whey materials derived from manufacture of colored dairy product, prior to or during production of another product from the byproduct whey materials.

One method for decolorizing whey material is mentioned by Chang et al. in Reactions of Benzoyl Peroxide with Whey that appeared in *J Dairy Science*, Vol. 60, pp 40–44 (January, 1977). Chang et al. mentioned that hydrogen peroxide or benzoyl peroxide may be added to whey that is a byproduct of cheese manufacture to give wheys colored with annatto extract "a more uniform color." However, as mentioned in Chang et al., the electrophoretic pattern of the whey proteins was altered by bleaching the whey containing the proteins with benzoyl peroxide. It is believed that this change in the electrophoretic pattern of the whey protein is indicative of denaturing of soluble whey proteins that occurs when protein-containing whey is bleached with an oxidizing agent, such as benzoyl peroxide.

U.S. Pat. No. 4,888,184 to Bottomley et al. also describes a process in which hydrogen peroxide is added to a whey material containing a significant or even concentrated amount of protein, including soluble protein, for purposes of oxidizing annatto extract included in the whey. However, it has been found that the technique of modifying whey color disclosed in the Bottomley patent, like the process mentioned in the Chang article, alters the electrophoretic pattern of the whey proteins, apparently by denaturing soluble proteins contained in the whey.

Denaturing of soluble proteins in whey materials is undesirable, since soluble proteins constitute a significant and valuable portion of the protein spectrum present in many whey materials. There is therefore an urgent need for a method of decolorizing whey materials containing soluble proteins along with coloring agents, such as annatto extract, without altering the soluble proteins that are contained in the colored whey material. Thus, a need exists for preserving the valuable soluble protein portion of whey materials while ridding the whey materials of undesirable color deriving from coloring agents, such as annatto extract.

BRIEF SUMMARY OF THE INVENTION

The present invention includes a method of producing a reduced color dairy product. The method involves a whey material that includes native and soluble protein and a coloring agent. The method includes separating the whey material into a first portion and a second portion, where the first portion includes at least about 30 weight percent, as determined by high pressure liquid chromatography at a detection wavelength of 280 nanometers, of the native and soluble protein present in the whey material prior to separation and the second portion includes at least about 50 weight percent of the coloring agent present in the whey material prior to separation. The method may also include partially or fully deactivating at least some of the coloring agent contained in the second portion. The present invention further includes a method of processing a dairy material.

DETAILED DESCRIPTION

Figure 1:
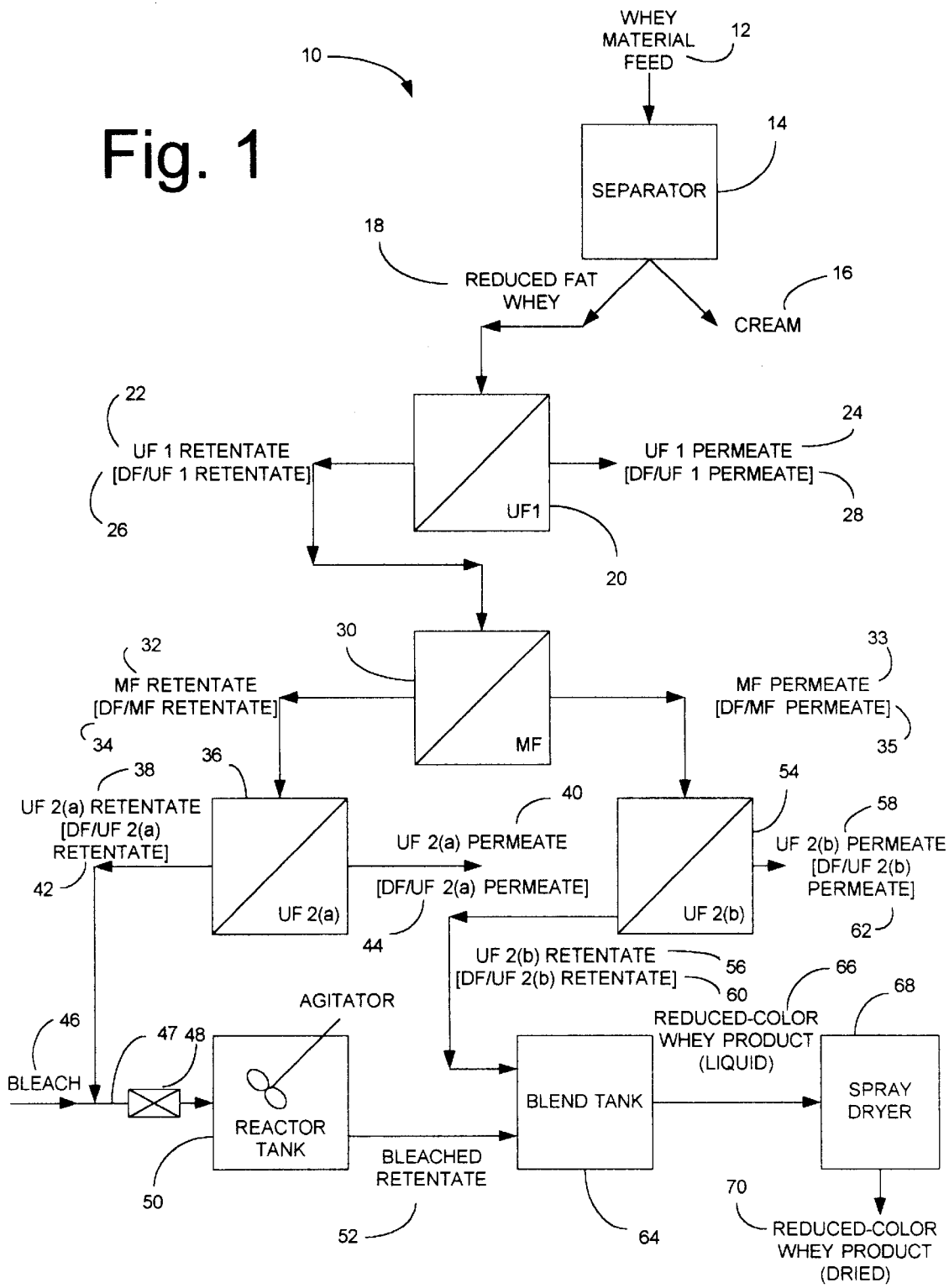
FIG. 1 is a block flow diagram of one process of the present invention for treating a whey material to reduce the color of the whey material.

The present invention concerns a technique for reducing the color of a dairy material, such as a whey material, that contains at least (1) native and soluble protein and (2) one or more coloring agents, while minimizing or predominantly eliminating denaturing of the native and soluble protein. In another aspect, the present invention concerns a technique for separating the dairy material, such as the whey material, containing native and soluble protein and coloring agent(s) into a first portion containing a substantial amount, such as at least about 30 weight percent, as determined by high pressure liquid chromatography at a detection wavelength of 280 nanometers, of the native and soluble protein present in the dairy material prior to separation and into a second portion containing at least about 50 weight percent, preferably at least about 80 weight percent, and more preferably at least about 99 weight percent of the coloring agent(s) present in the dairy material prior to separation. The second portion undergoes decolorizing treatment to deactivate or remove some or all of the coloring agent(s), such as dye, extract, or pigment, present in the second portion.

After the decolorizing treatment is completed on the second portion, the reduced color or decolorized dairy material derived from the second portion and the first portion, or a portion containing some, all or predominantly all, of the native and soluble protein of the first portion, may be blended together, in a ratio that is selected to attain a desired concentration of native and soluble protein and a desired concentration of fat in the resulting reduced color dairy product, such as a reduced color whey product. In a preferred alternative, after the decolorizing treatment is completed on the second portion, the first portion and the reduced color or decolorized dairy material derived from the second portion may be blended together, in a ratio that is selected to attain, after ultrafiltration of the blended first portion and reduced color or decolorized dairy material derived from the second portion, a desired concentration of protein, such as a desired concentration of native and soluble protein, and a desired concentration of fat in the resulting reduced dairy color product. This inventive technique of separating the coloring agent(s) from the native and soluble protein prior to removing, deactivating, or otherwise treating, the coloring agent(s) to reduce color, prevents the coloring agent treatment process from denaturing or otherwise degrading the native and soluble protein that is separated from the coloring agent(s).

Throughout this document, the terminology "decolorizing," "decolorized," "color reduction," "reduced color," "reduce color," "reduce the color," and "reducing the color" is variously used as a reference to a treatment for or a result of reducing the visible color exhibited by particular dairy material or as a reference to dairy material that has been treated to reduce the visible color of the dairy material. This "decolorizing," "decolorized," "color reduction," "reduced color," "reduce color," "reduce the color," and "reducing the color" terminology is collectively hereinafter referred to as the "color reduction terminology." Of course, all dairy material, such as whey and materials derived from whey, has some remaining visible color even after "decolorizing" the dairy material to yield dairy material having "reduced color." Thus, references to any of the color reduction terminology in the context of dairy material, are to be understood as meaning that, when practicing the technique of the present invention for producing any reduced color dairy material or any reduced color dairy product that is derived from the dairy material, the visible color, expressed in terms of L*, a*, and/or b*values, exhibited by the reduced color dairy material or the reduced color dairy product is reduced relative to the visible color, expressed in terms of L*, a*, and/or b*values, exhibited by a processed form of the dairy material.

L*, a*, and b* are each spectral variables in the CIELAB colorspace. As used herein, the term "processed form" means a form of the dairy material that has been processed identically to the reduced color dairy material, the reduced color dairy product, or other subject matter that is being compared to the dairy material, except that the coloring agent of the dairy material has not been removed, deactivated, or otherwise modified to any degree in the "processed form" of the dairy material.

The technique of the present invention for producing reduced color dairy material or reduced color dairy product that is derived from the dairy material causes at least the L* value to be increased (moved toward+100), the a* value to be moved nearer to zero, or the b* value to be moved toward zero for the reduced color dairy material or the reduced color dairy product, as compared to the respective L*, a*, or b* value of a processed form of the dairy material. Preferably, the technique of the present invention for producing reduced color dairy material or reduced color dairy product that is derived from the dairy material causes the L* value to be increased (moved toward +100), the a* value to be moved nearer to zero, and the b* value to be moved toward zero for the reduced color dairy material or the reduced color dairy product, as compared to the respective L*, a*, or b* value of a processed form of the dairy material.

More preferably, the technique of the present invention for producing reduced color dairy material or reduced color dairy product that is derived from the dairy material causes at least the L*, a*, or b* value of a spray dried form (moisture content of about 5 weight percent or less) of the reduced color dairy material or the reduced color dairy product to fall within the following ranges: L* (about +84 to about +100); a* (about 0 to about −2); or b* (about +16 to about +6). Most preferably, the technique of the present invention for producing reduced color dairy material or reduced color dairy product that is derived from the dairy material causes the L*, a*, and b* values of a spray dried form (moisture content of about 5 weight percent or less) of the reduced color dairy material or the reduced color dairy product to each fall within the following ranges: L* (about +84 to about +100); a* (about 0 to about −2); and b* (about +16 to about +6).

Additionally, the technique of the present invention for producing reduced color dairy material or reduced color dairy product that is derived from the dairy material causes at least the L*, a*, or b* value of a standard reconstituted mixture of a spray dried form (moisture content of about 5 weight percent or less) of the reduced color dairy material or the reduced color dairy product to fall within the following ranges: L* (about +66.5 to about +80); a* (about −5 to about +2); or b* (about +22 to about +5). Preferably, the technique of the present invention for producing reduced color dairy material or reduced color dairy product that is derived from the dairy material causes the L*, a*, and b* value of a standard reconstituted mixture of a spray dried form (moisture content of about 5 weight percent or less) of the reduced color dairy material or the reduced color dairy product to each fall within the following ranges: L* (about +66.5 to about +80); a* (about −5 to about +2); and b* (about +22 to about +5).

As used herein, the term "standard reconstituted mixture" means a mixture of 10% by weight of a spray dried form (moisture content of about 5 weight percent or less) of the particular dairy material and 90% by weight reverse osmosis water, where the mixture has been stirred until the spray dried form of the particular dairy material has fully dissolved and the mixture has subsequently been allowed to stand for one hour to permit evolution of bubbles.

The term "$protein_{N\&S(HPLC)}$", as used herein, is shorthand for "native and soluble protein, as determined by high pressure liquid chromatography at a detection wavelength of 280 nanometers" and refers collectively to a group of four particular proteins (β-lactoglobulin, α-lactalbumin, immunoglobulin G, and bovine serum albumin) that have not been denatured. Native proteins are typically soluble in aqueous solution. Proteins that have been denatured are typically insoluble in solvents, such as water, in which the proteins, prior to denaturing, were originally soluble. While there are native proteins that are soluble in water in addition to β-lactoglobulin, α-lactalbumin, immunoglobulin G, and bovine serum albumin, β-lactoglobulin, α-lactalbumin, immunoglobulin G, and bovine serum albumin are typically the predominant majority of native and soluble proteins present in dairy materials, such as whey materials, including cheese whey.

Thus, the term "$protein_{N\&S(HPLC)}$", as used herein, is an approximation of the total native and soluble protein content, since the "$protein_{N\&S(HPLC)}$" term, as used herein, encompasses at least the predominant majority of native and soluble proteins, but not necessarily all of the native and soluble proteins, present in a particular sample. Subsequent references to IgG are to be understood as being shorthand references to immunoglobulin G, and subsequent references to BSA are to be understood as being shorthand references to bovine serum albumin.

While the benefits of the present invention are particularly described and characterized in terms of β-lactoglobulin, α-lactalbumin, immunoglobulin G, and bovine serum albumin, it is believed that the benefit of preserving native and soluble proteins in the reduced color dairy material or the reduced color dairy product extends to all native and soluble proteins originally present in the dairy material, including, but not limited to, β-lactoglobulin, α-lactalbumin, immunoglobulin G, and bovine serum albumin.

The technique of the present invention may incorporate any separation method that is capable of separating the dairy material, such as the whey material, that contains at least native and soluble protein and coloring agent(s) into the first portion containing at least about a substantial amount, such as at least about 30 weight percent, of the $protein_{N\&S(HPLC)}$ present in the dairy material prior to separation and into the second portion containing at least about 50 weight percent, preferably at least about 80 weight percent, and more preferably at least about 99 weight percent of the coloring agent(s) present in the dairy material prior to separation. The technique of the present invention may further incorporate any separation technique that is capable of separating the first portion into a third portion and a fourth portion, where the third portion contains at least about 30 weight percent, and preferably at least about 60 weight percent, of the $protein_{N\&S(HPLC)}$ from the first portion.

Still further, the technique of the present invention may incorporate any separation technique that is capable of separating the second portion containing coloring agent(s) from the dairy material into a fifth portion and a sixth portion, where the fifth portion contains at least some of the coloring agent(s) from the second portion. Additionally, the technique of the present invention may incorporate any treatment method that is capable of fully or, if desired, partially deactivating the coloring agent(s) contained in, or removing the coloring agent from, the second portion or the fifth portion, prior to blending part or all of either the decolorized second portion or the decolorized fifth portion with part or all of either the first portion or the third portion. Furthermore, the technique of the present invention may incorporate any treatment method that is capable of fully or, if desired, partially removing the coloring agent(s) contained in the second portion or fifth portion, prior to blending part or all of either the decolorized second portion or the decolorized fifth portion with part or all of either the first portion or the third portion.

Throughout the drawings, like elements are referred to using like reference characters.

In one embodiment, the method of the present invention may be practiced using a process 10 that is depicted in FIG. 1. In the process 10, a dairy material feed, such as whey material feed 12, is introduced into a separator 14 to separate a portion of the fat contained in the feed 12 into cream 16 and reduced fat whey 18, while retaining dissolved solids (protein) and some residual fat in reduced fat whey 18. The reduced fat whey 18 is then fed to a first ultrafiltration unit 20 (designated as "UF 1" in FIG. 1) to yield an ultrafiltration retentate 22 (also referred to as "UF 1 retentate") and an ultrafiltration permeate 24 (also referred to as "UF 1 permeate"). The UF 1 retentate may optionally be diafiltered in the ultrafilter 20 to yield a diafiltration retentate 26 (also referred to as "DF/UF 1 retentate") and a diafiltration permeate 28 (also referred to as "DF/UF 1 permeate"). The step of ultrafiltering the reduced fat whey 18 in the ultrafilter 20 is useful for reducing the lactose, ash, and water content of the reduced fat whey 18 via discharge of lactose, ash, and water in the UF 1 permeate, while simultaneously concentrating the desirable dissolved solids (including $protein_{N\&S (HPLC)}$) of the reduced fat whey 18 in the UF 1 retentate. In the Figures, bracketing of the term describing a particular stream indicates the optional nature of this stream.

Next, the UF 1 retentate or, optionally, the DF/UF 1 retentate is fed to a microfilter 30 to separate the UF 1 retentate or DF/UF 1 retentate into a microfiltration retentate 32 (also referred to as "MF retentate") and a microfiltration permeate 33 (also referred to as "MF permeate"). The microfiltration step causes a substantial amount, such as at least about 30 weight percent, of the $protein_{N\&S(HPLC)}$ from the UF 1 retentate or the DF/UF 1 retentate to exit the microfilter 30 as part of the microfiltration permeate 33, whereas most of the fat and at least about 50 weight percent, preferably at least about 80 weight percent, and more preferably at least about 99 weight percent of the coloring agent, such as annatto extract, that enters the microfilter 30 leaves the microfilter 30 as part of the microfiltration retentate 32. The microfiltration retentate 32 may optionally be diafiltered in the microfilter 30 to yield a diafiltration retentate 34 (also referred to as "DF/MF retentate") and a diafiltration permeate 35 (also referred to as "DF/MF permeate"). The step of diafiltering the microfiltration retentate 32 in the microfilter 30 is useful for washing more native and soluble protein out of the microfiltration retentate 32 prior to color reduction treatment, such as bleaching, of the coloring agent.

All microfiltration, ultrafiltration, and diafiltration steps in accordance with the present invention may be conducted either continuously or in batch-wise operation. Besides the advantage of reduced equipment and operating costs, continuous operation also allows for better control of microbial growth due to less fluid residence time at temperatures that are conducive to bacterial growth.

Though the process 10 depicts both the separator 14 and the ultrafilter 20, it is to be understood that the whey material feed 12 could optionally be fed directly to the microfilter 30, by leaving the separator 14 and ultrafilter 20 out of the process 10. One effect of leaving the separator 14 and ultrafilter 20 out of the process 10 is that a higher percentage of fat remains in the feed to the microfilter 30, which may decrease the efficiency of microfiltration in the microfilter 30. Alternatively, the separator 14 may be left out of the process 10 so that the whey material feed 12 is fed directly to the ultrafilter 20. One effect of leaving the separator 14 out of the process 10 is that a higher percentage of fat remains in the feed to the ultrafilter 20, which may decrease the efficiency of ultrafiltration in the ultrafilter 20. Despite the prospect of these potential inefficiencies, the technique of the present invention for reducing the color of the dairy material, such as the whey material, that includes coloring agent and native and soluble protein remains effective even if the separator 14, or the separator 14 and the ultrafilter 20, are left out of the process 10. However, it is preferred to leave both the separator 14 and the ultrafilter 20 in the system 10 to maximize the efficiency of the microfiltration step in the microfilter 30.

The microfiltration step preferably causes at least about 50 weight percent of the $protein_{N\&S(HPLC)}$ in the microfilter 30 feed to exit the microfilter 30 as part of the microfiltration permeate 33 (or as part of the diafiltration permeate 35) and preferably also causes at least about 80 weight percent of the coloring agent, such as annatto extract, in the microfilter 30 feed to leave the microfilter 30 as part of the microfiltration retentate 32 (or as part of the diafiltration retentate 34). More preferably, the microfiltration step causes at least about 60 weight percent of the $protein_{N\&S(HPLC)}$ in the microfilter 30 feed to exit the microfilter 30 as part of the microfiltration permeate 33 (or as part of the diafiltration permeate 35) and also predominantly all, such as at least about 99 weight percent, of the coloring agent, such as annatto extract, in the microfilter 30 feed to leave the microfilter 30 as part of the microfiltration retentate 32 (or as part of the diafiltration retentate 34).

The ability of the microfilter 30 to effect separation of at least about 50 weight percent, preferably at least about 80 weight percent, and more preferably at least about 99 weight percent of the coloring agent, in the case of annatto extract, in the microfilter 30 feed into the microfiltration retentate 32 (or optionally the diafiltration retentate 34), rather than primarily into the native and soluble protein rich microfiltration permeate 33 (or optionally the diafiltration permeate 35), is a particularly surprising result since it is believed that the annatto extract is both soluble in water and also bound to the surface of water soluble protein particles.

Though surprising, the retention of at least 50 weight percent, more preferably at least about 80 weight percent, and more preferably predominantly all, such as at least about 99 weight percent, of the coloring agent(s) from the microfilter 30 feed in the microfiltration retentate 32 (or optionally the diafiltration retentate 34) is advantageous, since it permits action on the microfiltration retentate 32, or streams derived from the microfiltration retentate 32, to separate or deactivate the coloring agent(s), without subjecting the soluble proteins of the microfiltration permeate 33 (or optionally the diafiltration permeate 35) to these separation or deactivation conditions. Thereby, the present invention permits a substantial amount, such as at least about 30 weight percent, preferably at least about 50 weight percent, and more preferably at least about 60 weight percent, of the $protein_{N\&S(HLPC)}$ in the feed to the microfilter 30 to be preserved, while later removing or deactivating at least some or more preferably predominantly all of the coloring agent present in the feed to the microfilter 30.

In one embodiment of the present invention, the microfiltration retentate 32 (or optionally the diafiltration retentate 34) is fed to an ultrafilter 36 (designated as "UF 2(a)" in the Figures) and separated into an ultrafiltration retentate 38 (also referred to as "UF 2(a) retentate") and an ultrafiltration permeate 40 (also referred to as "UF 2(a) permeate"). Thereafter, the UF 2(a) retentate may optionally be diafiltered in the ultrafilter 36 to form a diafiltration retentate 42 (also referred to as "DF/UF 2(a) retentate") and a diafiltration permeate 44 (also referred to as "DF/UF 2(a) permeate"). Likewise, the microfiltration permeate 33 (or optionally the diafiltration permeate 35) may be ultrafiltered in an ultrafilter 54 (designated as "UF 2(b)" in the Figures) to form an ultrafiltration retentate 56 (also referred to as "UF 2(b) retentate") and an ultrafiltration permeate 58 (also referred to as "UF 2(b) permeate"). Also, the UF 2(b) retentate may be diafiltered in the ultrafilter 54 to form a diafiltration retentate 60 (also referred to as "DF/UF 2(b) retentate") and a diafiltration permeate 62 (also referred to as "DF/UF 2(b) permeate").

Ultrafiltration of the microfiltration retentate 32 (or optionally the diafiltration retentate 34) in the ultrafilter 36 along with diafiltration of the UF 2(a) retentate in the ultrafilter 36 are beneficial because, as subsequently demonstrated in Example 28, this ultrafiltration and diafiltration step removes some of the coloring agent and thereby reduces the amount of coloring agent to be deactivated, removed, or otherwise treated to effect color reduction subsequent to the ultrafilter 36. Also, this use of the ultrafilter 36 for ultrafiltration and diafiltration removes a substantial amount of water from the microfiltration retentate 32 (or optionally the diafiltration retentate 34), thereby minimizing the amount of water needed to be removed subsequently by drying, such as by spray drying. Related comments apply to use of the ultrafilter 54 for ultrafiltration and diafiltration. First, as subsequently demonstrated in Example 28, some of the small amount of coloring agent, such as annatto extract, going into the microfiltration permeate 33 (or optionally the diafiltration permeate 35) is removed as permeate 58 or as diafiltration permeate 62 via subsequent ultrafiltration and diafiltration in ultrafilter 54. Also, a substantial amount of the water in the microfiltration permeate 33 (or optionally the diafiltration permeate 35) is removed by ultrafiltration and diafiltration in the ultrafilter 54, which thereby helps to minimize the amount of drying required later, such as spray drying.

In preparation for deactivating the coloring agent(s), the ultrafiltration retentate 38, or optionally the diafiltration retentate 42, is heated, such as via an in-line heater or a conventional tubular or plate heat exchanger, and then combined in-line with bleach 46 to form a bleach-containing retentate 47. The bleach-containing retentate 47 is mixed by turbulence, such as turbulent flow conditions present in the line carrying the bleach-containing retentate 47 or by passing the bleach-containing retentate 47 through an optional in-line mixer 48. Suitable examples of the optional in-line mixer 48 are the KENICS® KM series and the KENICS® HEV series of static mixers that are available from Chemineer, Inc (A Unit of Robbins & Myers, Inc.) of Dayton, Ohio.

After undergoing turbulent mixing, the bleach-containing retentate 47 flows into a reactor tank 50 which is agitated. The mixture of bleach 46 and ultrafiltration retentate 38 or diafiltration retentate 42 is retained in the reactor tank 50, while maintaining the desired temperature and agitating the mixture, until the bleach has deactivated the coloring agent, such as annatto extract, to the desired degree. The bleach is believed to deactivate the coloring agent via an oxidation reaction. Various factors may be adjusted to vary the degree of coloring agent deactivation in the reactor tank 50. These include, but are not necessarily limited to, the concentration of the bleach 46 in the ultrafiltration retentate 38 or diafiltration retentate 42 relative to the coloring agent content of the ultrafiltration retentate 38 or diafiltration retentate 42, the temperature of the bleach-containing retentate 47 in the tank 50, and the holding time for the bleach-containing retentate 47 in the tank 50.

After the bleaching of the coloring agent(s) has proceeded to the desired degree in the tank 50, a bleached retentate 52 is transferred from the tank 50 into a blend tank 64. Also, the ultrafiltration retentate 56 or, optionally, the diafiltration retentate 60 is transferred into the blend tank 64 to be combined with the bleached retentate 52. The ultrafiltration retentate 56 (or optionally the diafiltration retentate 60) and the bleached retentate 52 are combined in the blend tank 64 in an appropriate ratio to attain a desired percent of fat and a desired percent of native and soluble protein in a reduced color dairy product, such as a reduced color whey product 66. The ultrafiltration retentate 56 (or optionally the diafiltration retentate 60) and the bleached retentate 52 may be combined in the blend tank 64 to attain a desired fat/protein profile in the reduced color whey product 66, such as about 82 weight percent total Kjeldahl nitrogen (dry basis) and about 6 weight percent fat (dry basis). After the appropriate blend is produced in the blend tank 64, the reduced color whey product 66 is transferred to a spray dryer 68 where the reduced color whey product 66 is spray dried to form a powdered or dried reduced color dairy product, such as a powdered or dried reduced color whey product 70.

This reduced color whey product 70 preferably contains none, or substantially none of the coloring agent, such as annatto extract, originally contained in the whey material feed 12, though some residual or treated form or variation of the original coloring agent that does not detract from the reduced color attributes of the reduced color whey product 70 may remain in the reduced color whey product 70. The reduced color whey product 70 does, however, contain a substantial amount, such as at least about 30 weight percent, preferably at least about 50 weight percent, and more preferably at least about 60 weight percent, of the protein$_{N\&S}$ $_{(HPLS)}$ originally present in the feed to the microfilter 30. This is very desirable, since the high native and soluble protein content/low color property of the reduced color whey product 70 permits the reduced color whey product 70 to be beneficially used in a variety of high value food products. Also, the absence, or predominant absence, of the original coloring agent in food products based upon the reduced color whey product 70 further serves to enhance the value of the food products in the eyes of the consumer.

Figure 2:
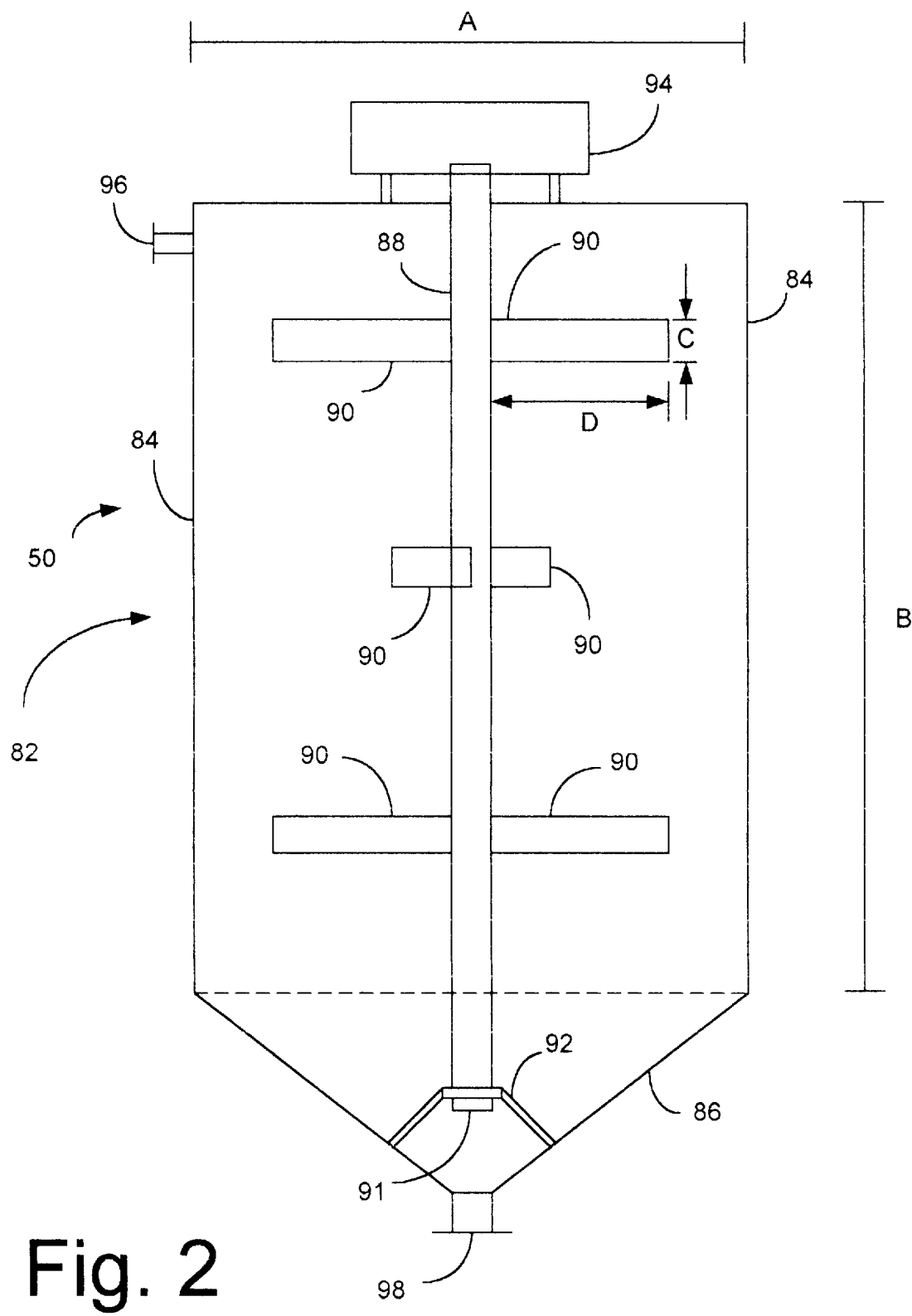
FIG. 2 is a side plan view of a reactor tank of the present invention for treating a whey material to reduce the color of the whey material.

The reactor tank 50 should be capable of maintaining at least substantially plug flow conditions during the reaction of the bleach 46 and the coloring agent component of the ultrafiltration retentate 38, or optionally the diafiltration retentate 42. One suitable example of the reactor tank 50 may take the form of a tank 82, as best depicted in FIG. 2. The tank 82 has a cylindrical wall 84, an internal diameter A within the cylindrical wall 84 of about 24 inches, and a capacity of about 70 gallons. The cylindrical wall 84 has a height B of about 42 inches. The tank 82 includes a dish-shaped, shallow cone bottom 86 to permit full evacuation of the tank 82. The tank 82 includes an agitator 88 having a plurality of paddles 90. Each paddle 90 has a width C of about 2 inches, a length D of about 12 inches, and a thickness (not shown) of about ⅜ of an inch. The agitator 88 has a lower end 91 that is rotatably mounted within a thrust bearing 92 that is secured within the bottom 86.

The agitator 88 is powered by an electric motor 94 that is capable of selectively rotating the agitator 88 at relatively low rotational speeds on the order of between about 2 revolutions per minute and about 20 revolutions per minute to minimize vertical mixing and maintain at least substantially plug flow conditions within the tank 82. Rotational speeds above about 20 revolutions per minute would diminish the stratification and laminar flow with the tank 82 and thereby destroy the desired plug flow conditions. It has been determined that rotational speeds of the agitator 88 between about 12 revolutions per minute and about 15 revolutions per minute optimize the bleaching reaction within the tank 82. The tank 82 additionally includes an upper inlet 96 for placing the mixture of bleach 46 and the ultrafiltration retentate 38, or optionally the diafiltration retentate 42, within the tank 82 and an outlet 98 from the bottom 86 for removing bleached retentate 52 from the tank 82. A tank meeting the specifications provided above for the tank 82 and the agitator 88 may be obtained from Waukesha Cherry-Burrell of Delavan, Wis.

Though the technique of bleaching the coloring agent to effect color reduction in accordance with the present invention is initially described in terms of bleaching the coloring agent under plug flow conditions in the tank 50, any other apparatus that is capable of effecting bleaching of the coloring agent under plug flow conditions may be substituted in place of the tank 50. For example, a holding tube that is capable of effecting bleaching of the coloring agent under plug flow conditions may be substituted in place of the tank 50.

The bleach 46 may be any suitable bleaching material, in dry, liquid, or gaseous form, that is capable of oxidizing the coloring agent, such as annatto extract. One example of a suitable bleaching material is OXYLITE® type XX bleaching powder, which may be obtained from Research Products Company of Salina, Kans. The active bleaching agent in OXYLITE® type XX bleaching powder is benzoyl peroxide. Other non-exhaustive examples of suitable bleaching materials include ozone and hydrogen peroxide.

The bleaching agent employed in the bleach 46 may be combined with the ultrafiltration retentate 38, or optionally the diafiltration retentate 42, in a range of ratios to effect the reduction of visible color caused by the coloring agent. The amount of bleaching agent added is dependant on the concentration of single-strength coloring agent contained in the ultrafiltration retentate 38, or optionally the diafiltration retentate 42. However, in practice, it is difficult or even impossible to accurately to determine this concentration. A more practical approach is to determine the amount of bleaching agent to add to the ultrafiltration retentate 38, or optionally the diafiltration retentate 42, based upon the desired properties of the bleached retentate 52 or of a downstream product that incorporates the bleached retentate 52. One desired property may take the form of a particular color or particular match or approximate match in color.

One preferred result of the present invention, and therefore of the bleaching aspect of the present invention, is to cause the color of the reduced color whey product 70 that is based on the dairy material, such as the whey material feed 12, containing the coloring agent to match, or closely match, the color of a spray-dried product that is based on the dairy material, such as the whey material feed 12, not containing coloring agent, where the spray-dried product has the same, or approximately the same, moisture content and native and soluble protein profile as the reduced color whey product 70. Another preferred result of the present invention, and therefore of the bleaching aspect of the present invention, is to cause the color of a reconstituted form of the reduced color whey product 70 that is based on the dairy material, such as the whey material feed 12, containing the coloring agent to match, or closely match, the color of the reconstituted form of a spray-dried product that is based on the dairy material, such as the whey material feed 12, not containing coloring agent, where the reconstituted form of the spray-dried product has the same, or approximately the same, moisture content and native and soluble protein profile as the reconstituted form of the reduced color whey product 70.

Thus, in addition to attaining a particular color in the bleached retentate 52 or of a downstream product that incorporates the bleached retentate 52, another desired property is that denaturing of any residual native and soluble protein contained in the ultrafiltration retentate 38, or optionally the diafiltration retentate 42, be minimized or eliminated altogether. Though a range of concentrations of bleach in the ultrafiltration retentate 38, or optionally the diafiltration retentate 42, may create the desired color in the bleached retentate 52 or of a downstream product that incorporates the bleached retentate 52, the actual concentration of bleach in the ultrafiltration retentate 38, or optionally the diafiltration retentate 42, that is selected from this range is preferably minimized to minimize, or eliminate, denaturing of any residual native and soluble protein contained in the ultrafiltration retentate 38, or optionally in the diafiltration retentate 42. The use of plug flow conditions and relatively low temperatures on the order of about 170° F. or less in the reactor tank 50 further helps to minimize, or eliminate, denaturing of any residual native and soluble protein contained in the ultrafiltration retentate 38, or optionally in the diafiltration retentate 42.

Though the color reduction aspect of the present invention is initially described in terms of bleaching the coloring agent in the tank 50, any other suitable technique of modifying, treating, or removing the coloring agent may be substituted in place of bleaching the coloring agent in the tank 50 to achieve the beneficial color reduction aspects of the present invention. Such suitable techniques may, for example, include any chemical modification process by a variety of chemical agents, including but not limited to an oxidant, a reductant, an acid, or a base, that is capable of reducing the color exhibited by the coloring agent, or any chemical modification process by an energy source, such as microwave or ultraviolet radiation, that is capable of reducing the color exhibited by the coloring agent. Other acceptable alternatives to bleaching the coloring agent in the tank 50 include techniques that physically remove some, or preferably all, of the coloring agent, such as physical removal techniques, including but not limited to carbon or resin absorption techniques, that are capable of effecting color reduction in the reduced color whey product 70. Of course, the production scheme employing any of these alternative color reduction techniques or coloring agent removal techniques would necessarily need to use only food grade treatment agents or would require an appropriate technique to separate out any residual treatment agent, or derivative thereof, that is unsuitable for human consumption.

Figure 3:
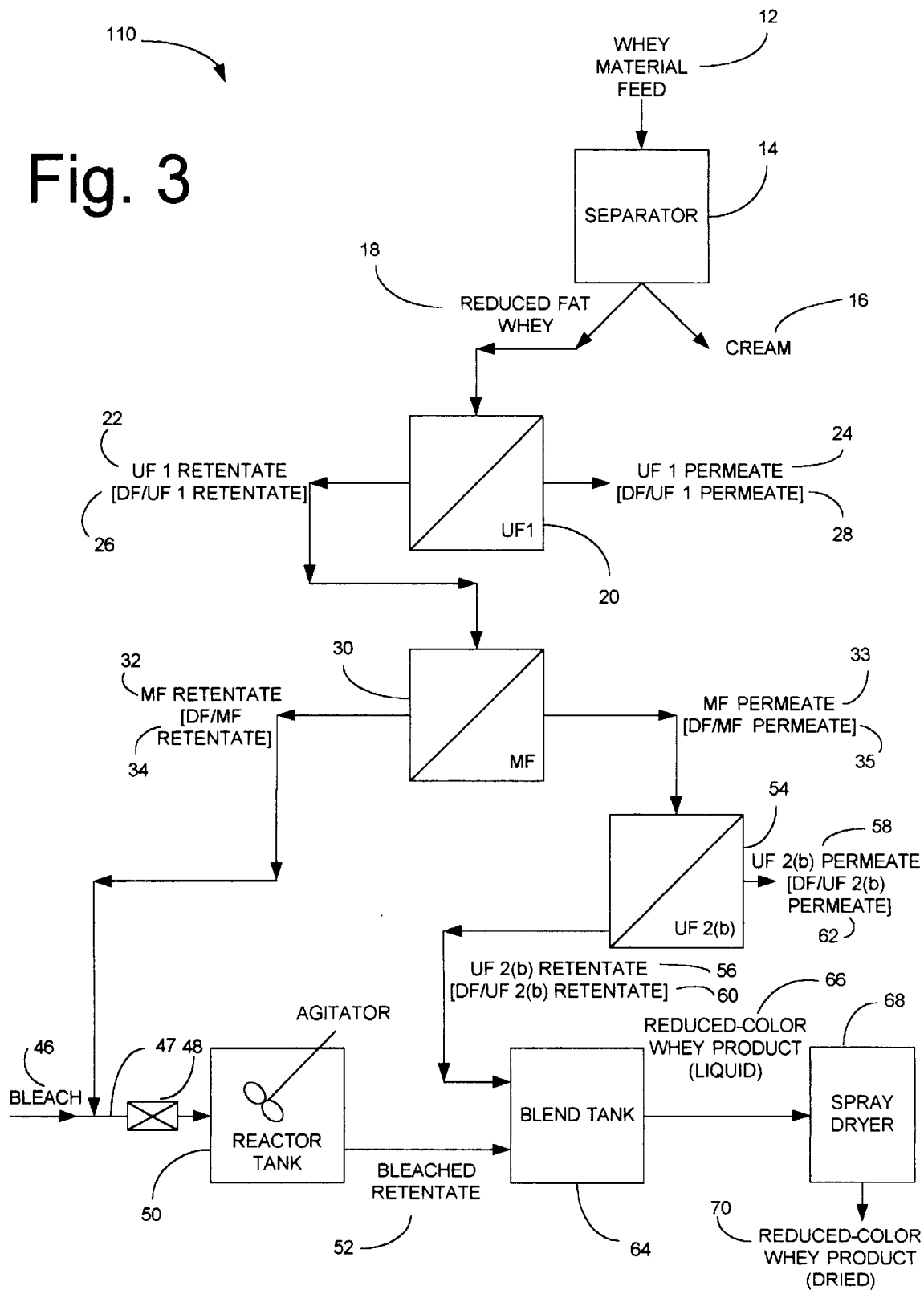
FIG. 3 is a block flow diagram of another process of the present invention for treating a whey material to reduce the color of the whey material.

The method of the present invention may alternatively be practiced using a process 110 that is depicted in FIG. 3. The process 110 is similar to the process 10, with the exception that the ultrafilter 36 of the process 10 is not included in the process 110. Therefore, the microfiltration retentate 32 (or optionally the diafiltration retentate 34), instead of the ultrafiltration retentate 38 or the optional diafiltration retentate 42, is heated and then combined in-line with bleach 46 to form the bleach-containing retentate 47 that is subsequently fed to the reactor tank 50 for bleaching of the coloring agent, such as annatto extract.

The bleaching agent employed in the bleach 46 may be combined with the microfiltration retentate 32 (or optionally the diafiltration retentate 34) in a range of ratios to effect the reduction of visible color caused by the coloring agent. The amount of bleaching agent added is dependant on the concentration of single-strength coloring agent contained in the microfiltration retentate 32 (or optionally the diafiltration retentate 34). The amount of bleaching agent to add to the microfiltration retentate 32 (or optionally the diafiltration retentate 34) may be determined based upon the desired properties of the bleached retentate 52 or of a downstream product that incorporates the bleached retentate 52.

One desired property may take the form of a particular color or particular match or approximate match in color. One preferred result of the present invention, and therefore of the bleaching aspect of the present invention, is to cause the color of the reduced color whey product 70 that is based on the whey material feed 12 containing the coloring agent to match, or closely match, the color of a spray-dried product that is based on whey material feed 12 not containing coloring agent, where the spray-dried product has the same, or approximately the same, moisture content and native and soluble protein profile as the reduced color whey product 70.

Another desired property is that denaturing of any residual native and soluble protein contained in the microfiltration retentate 32 (or optionally the diafiltration retentate 34), be minimized or eliminated altogether. Thus, though a range of concentrations of bleach in the microfiltration retentate 32 (or optionally the diafiltration retentate 34), may create the desired color in the bleached retentate 52 or of a downstream product that incorporates the bleached retentate 52, the actual concentration of bleach in the microfiltration retentate 32 (or optionally the diafiltration retentate 34), that is selected from this range is preferably minimized to minimize, or eliminate, denaturing of any residual native and soluble protein contained in the microfiltration retentate 32 (or optionally the diafiltration retentate 34). The use of plug flow conditions and relatively low temperatures on the order of about 170° F. or less in the reactor tank 50 further helps to minimize, or eliminate, denaturing of any residual native and soluble protein contained in the microfiltration retentate 32 (or optionally the diafiltration retentate 34).

The process 10 has some beneficial aspects versus the process 110, since ultrafiltration (and optional diafiltration) in the ultrafilter 36 removes water from the microfiltration retentate 32 (or optionally the diafiltration retentate 34) and therefore desirably reduces the amount of water removal that must occur in the spray dryer 68. Also, this ultrafiltration and optional diafiltration in the ultrafilter 36 removes some coloring agent from the microfiltration retentate 32 and thereby reduces the amount of bleaching required in the reactor tank 50. Furthermore, the ultrafiltration and optional diafiltration in the ultrafilter 36 removes some lactose and ash from the microfiltration retentate 32 and thereby reduces the amount of lactose and ash present in the dried reduced-color whey product 70.

Figure 4:
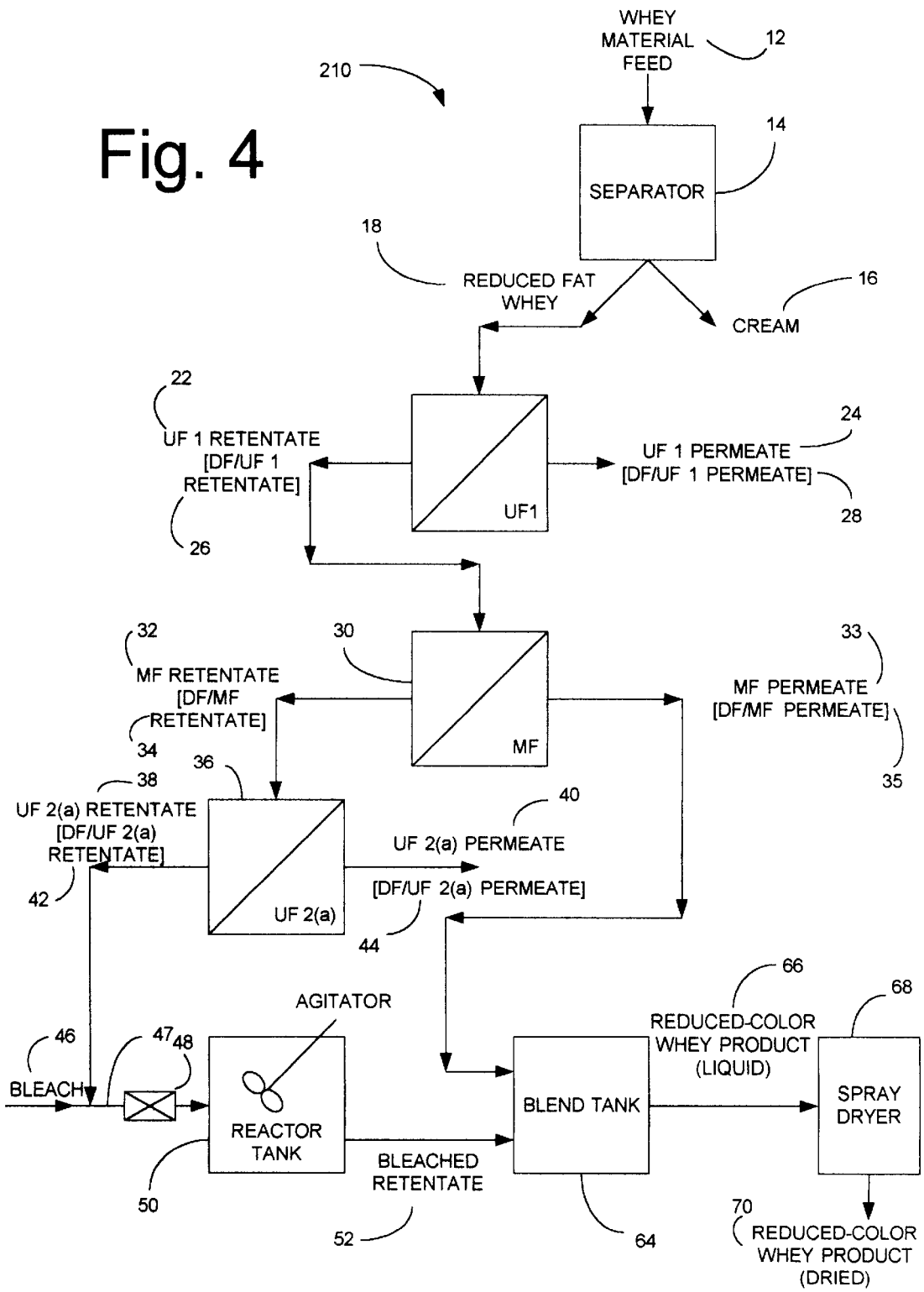
FIG. 4 is a block flow diagram of another process of the present invention for treating a whey material to reduce the color of the whey material.

The method of the present invention may alternatively be practiced using a process 210 that is depicted in FIG. 4. The process 210 is similar to the process 10, with the exception that the ultrafilter 54 of the process 10 is not included in the process 210. Therefore, the microfiltration permeate 33 (or optionally the diafiltration permeate 35) is fed directly to the blend tank 64 for blending with the bleached retentate 52. Similar comments to those provided above apply in regard to the process 10 apply to the process 210 with respect to selection of the amount of bleach 46 to combine with the ultrafiltration retentate 38, or optionally the diafiltration retentate 42, for purposes of reducing visible color caused by the coloring agent.

The process 10 has some beneficial aspects versus the process 210, since ultrafiltration (and optional diafiltration) in the ultrafilter 54 removes water from the microfiltration permeate 33 (or optionally the diafiltration permeate 35) and therefore desirably reduces the amount of water removal that must occur in the spray dryer 68. Also, this ultrafiltration and optional diafiltration in the ultrafilter 54 removes some coloring agent from the microfiltration permeate 33 and thereby reduces the amount of non-bleached coloring agent that reaches the blend tank 64. Furthermore, the ultrafiltration and optional diafiltration in the ultrafilter 54 removes some lactose and ash from the microfiltration permeate 33 and thereby reduces the amount of lactose and ash present in the dried reduced-color whey product 70.

Figure 5:
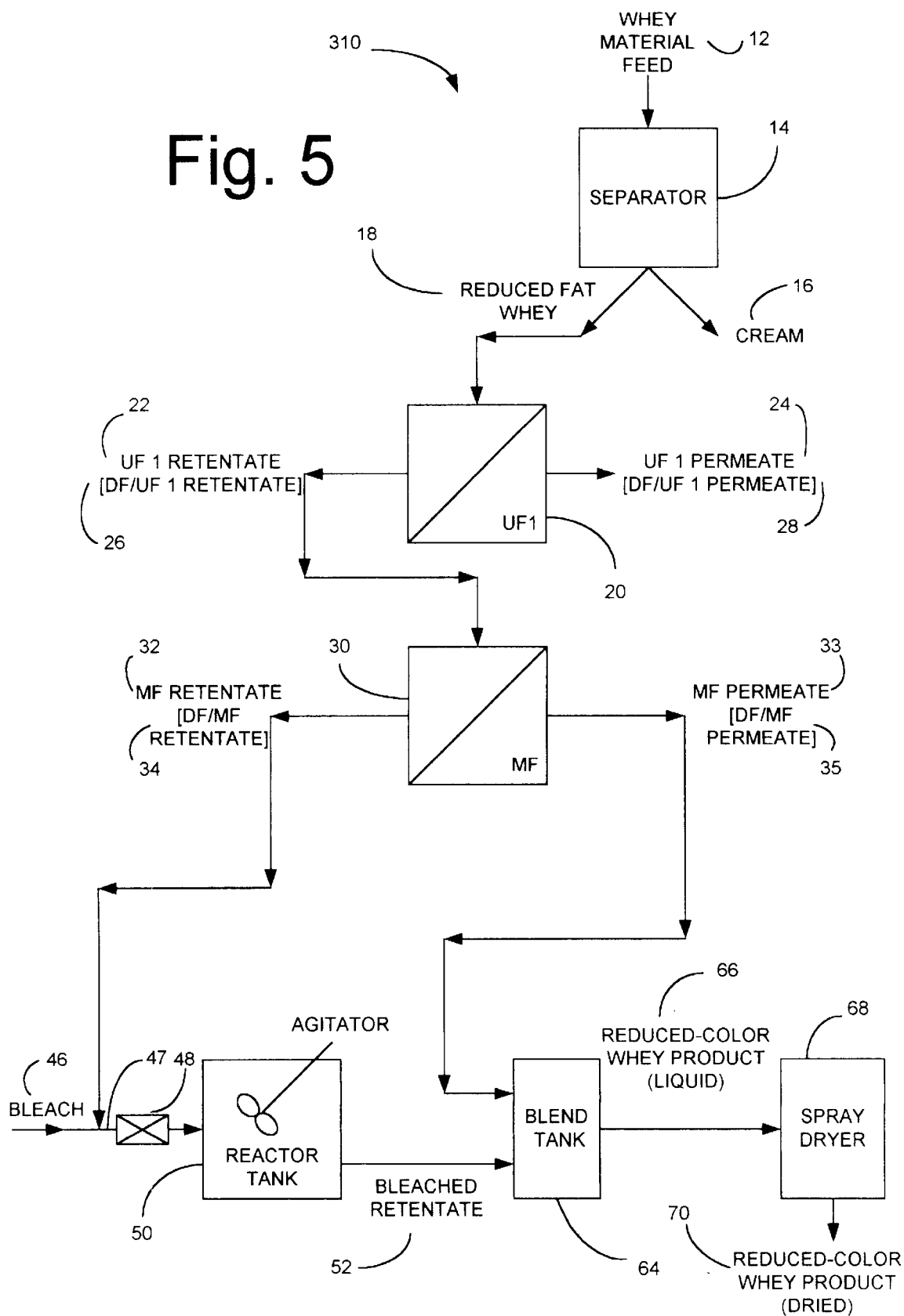
FIG. 5 is a block flow diagram of another process of the present invention for treating a whey material to reduce the color of the whey material.

The method of the present invention may alternatively be practiced using a process 310 that is depicted in FIG. 5. The process 310 is similar to the process 10, with the exception that the ultrafilter 36 and the ultrafilter 54 of the process 10 are not included in the process 310. Therefore, the microfiltration retentate 32 (or optionally the diafiltration retentate 34), instead of the retentate 38 or the optional diafiltration retentate 42, is heated and then combined in-line with bleach 46 to form the bleach-containing retentate 47 that is subsequently fed to the reactor tank 50 for bleaching of the coloring agent, such as annatto extract. Also, the microfiltration permeate 33 (or optionally the diafiltration permeate 35) is fed directly to the blend tank 64 for blending with the bleached retentate 52. Similar comments to those provided above apply in regard to the process 110 apply to the process 310 with respect to selection of the amount of bleach 46 to combine with the microfiltration retentate 32 (or optionally the diafiltration retentate 34), for purposes of reducing visible color caused by the coloring agent.

The process 10 has some beneficial aspects versus the process 310, since ultrafiltration (and optional diafiltration) in the ultrafilter 36 and in the ultrafilter 54 removes water from the microfiltration retentate 32 (or optionally the diafiltration retentate 34) and the microfiltration permeate 33 (or optionally the diafiltration permeate 35) and therefore desirably reduces the amount of water removal that must occur in the spray dryer 68. Furthermore, the ultrafiltration and optional diafiltration in the ultrafilter 36 and in the ultrafilter 54 removes some lactose and ash from the microfiltration retentate 32 and from the microfiltration permeate 33, respectively, and thereby reduces the amount of lactose and ash present in the dried reduced-color whey product 70.

Figure 6:
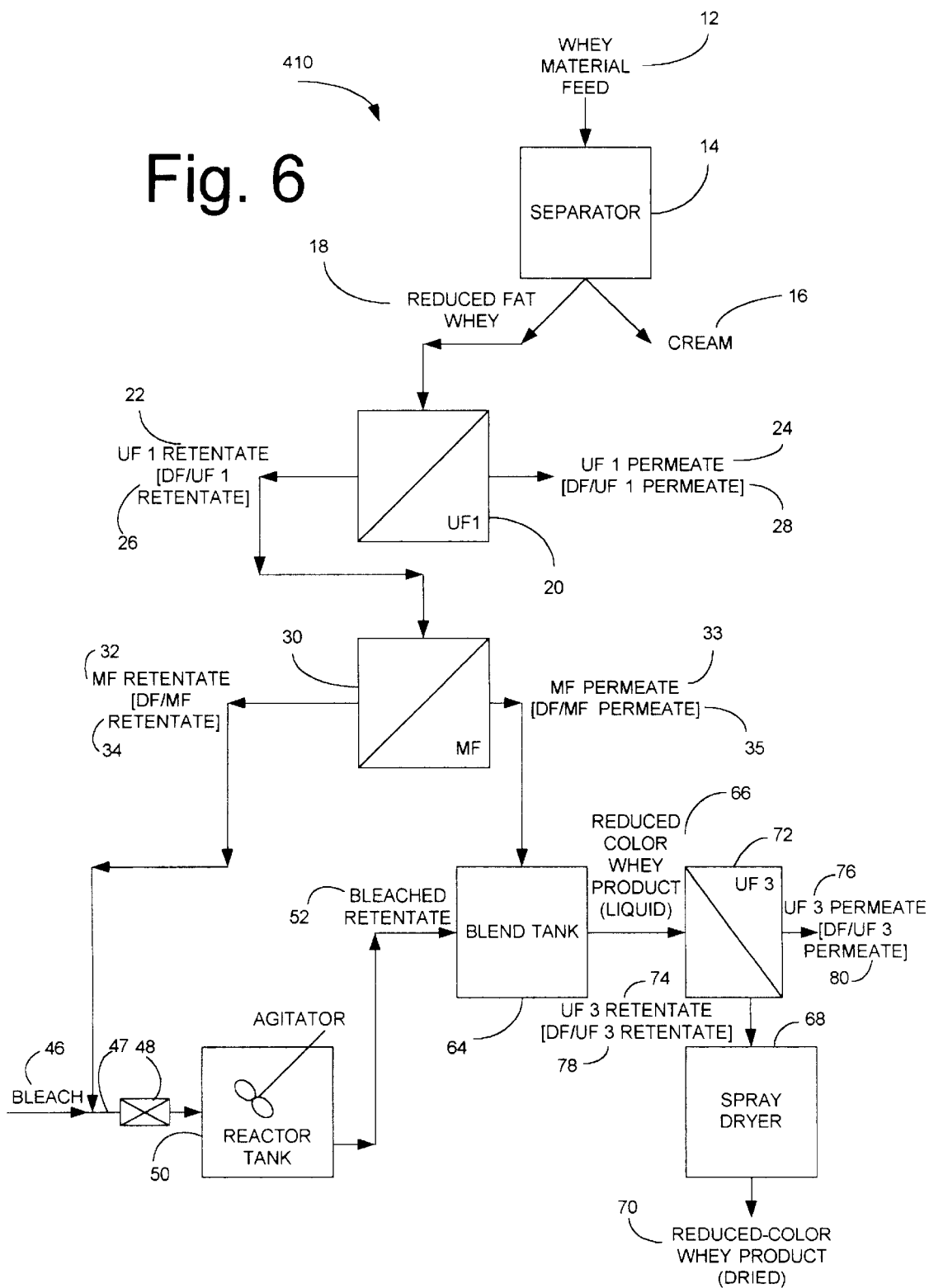
FIG. 6 is a block flow diagram of another process of the present invention for treating a whey material to reduce the color of the whey material.

The method of the present invention may alternatively be practiced using a process 410 that is depicted in FIG. 6. The process 410 is somewhat similar to the process 210 of FIG. 4, with the exception that the ultrafilter 36 of the process 210 is not included in the process 410. Instead, an ultrafilter 72 is included in the process 410 between the blend tank 64 and the spray dryer 68. Therefore, the microfiltration retentate 32 (or optionally the diafiltration retentate 34) is fed directly to the reactor tank 50 for bleaching of the coloring agent, such as annatto extract. Also, the microfiltration permeate 33 (or optionally the diafiltration permeate 35) is fed directly to the blend tank 64 for blending with the bleached retentate 52. The reduced color whey product 66 from the blend tank 64 is then fed to the ultrafilter 72 (designated as "UF 3") and separated into an ultrafiltration retentate 74 (also referred to as "UF 3 retentate") and an ultrafiltration permeate 76 (also referred to as "UF 3 permeate").

Thereafter, the ultrafiltration retentate 74 may optionally be diafiltered in the ultrafilter 72 to form a diafiltration retentate 78 (also referred to as "DF/UF 3 retentate") and a diafiltration permeate 80 (also referred to as "DF/UF 3 permeate"). The ultrafiltration retentate 74 and the optional diafiltration 78 retentate each amount to a concentrated reduced color whey product (liquid). The ultrafiltration retentate 74, or the optional diafiltration retentate 78, are fed to the spray dryer 68 that forms the dried reduced color whey product 70. Similar comments to those provided above apply in regard to the process 110 apply to the process 410 with respect to selection of the amount of bleach 46 to combine with the microfiltration retentate 32 (or optionally the diafiltration retentate 34), for purposes of reducing visible color caused by the coloring agent.

The process 410 has some beneficial aspects versus the process 10, the process 110, the process 210, and the process 310, since the ultrafilter 72 delivers the most concentrated form (highest solids content) of the reduced color whey product 66 to the spray dryer 68, thereby desirably reducing the amount of water removal that must occur in the spray dryer 68, as compared to the process 10, the process 110, the process 210, and the process 310. Ultrafiltration of the reduced color whey product 66 in the ultrafilter 72, along with the optional diafiltration of the ultrafiltration retentate 74 in the ultrafilter 72, are preferred because, as supported by the details of subsequent Example 28, this ultrafiltration and optional diafiltration step serves as a final "clean-up" step that removes all, or essentially all, of any water-soluble coloring agent that exists in the microfiltration permeate 33 component (or optionally in the diafiltration permeate 35 component) of the reduced color whey product 66. Also, this ultrafiltration and optional diafiltration step serves as a final "clean-up" step that removes all, or essentially all, of any residual bleaching components, such as benzoates, existing in the bleached retentate 52 component of the reduced color whey product 66 as a result of the bleaching process that occurs in the reactor tank 50.

The source of the dairy material processed in accordance with the present invention may be bovine, ovine, caprine, or the like. The dairy material, such as any whey material or material derived from whey including but not limited to the whey material feed 12, that may be processed in accordance with the present invention may include any dairy material, such as whey derived from whole milk, partially or completely skimmed milk; or any concentrated form of whey, including, but not limited to, whey protein concentrate that has had any amount of water, fat, minerals, or denatured protein removed prior to processing in accordance with the present invention. For example, the dairy material, such as the whey material feed 12, could be the whey byproduct of cheddar cheese production, the whey byproduct of cream cheese production, or the whey byproduct of Quarg production. Quarg is a fresh cheese made from coagulated skimmed milk. Also, the dairy material, such as the whey material feed 12, could be whey protein concentrate that has been previously ultrafiltered or processed to remove water, lactose, and/or ash.

Other examples of the dairy material that may be processed in accordance with the present invention include dairy products, such as milk, milk-based beverages, yogurt, and ice cream mixes that may be substituted in place of the whey material feed 12 in any form of the process of the present invention, such as in any of the processes 10, 110, 210, 310, or 410, for purposes of removing or deactivating coloring agents contained in the milk, milk-based beverages, yogurt, and ice cream mixes via the process of the present invention.

The application of the present invention is particularly described in the Examples with respect to annatto extract, and the bleach-based deactivation thereof. However, other types of coloring agents that could be separated from native and soluble proteins in accordance with the present invention and subsequently chemically deactivated by oxidation or other chemical mechanisms or physically removed in accordance with the present invention include, but are not limited to, coloring agents such as β-carotene, apo-8-carotenal, canthaxanthin, paprika oleoresin, turmeric, and beet extract. β-carotene, apo-8-carotenal, canthaxanthin, paprika oleoresin, turmeric, and beet extract are each food coloring agents that are being used as or could be used as dairy product coloring agents, such as cheese coloring agents.

β-carotene, apo-8-carotenal, canthaxanthin, paprika oleoresin, turmeric, and beet extract are each examples of coloring agents that could be separated from native and soluble proteins in accordance with the present invention because β-carotene, apo-8-carotenal, canthaxanthin, paprika oleoresin, turmeric, and beet extract, like annatto extract, each have long conjugated unsaturated chains. Also, annatto extract, β-carotene, apo-8-carotenal, canthaxanthin, paprika oleoresin, turmeric, and beet extract are each examples of coloring agents that could be deactivated by oxidation in accordance with the present invention because the long conjugated unsaturated chains of these coloring agents are readily disrupted by oxidation and related chemical reactions, thereby negating, or at least reducing, the coloring characteristic of the original annatto extract, β-carotene, apo-8-carotenal, canthaxanthin, paprika oleoresin, turmeric, and/or beet extract.

The purpose of the microfilter 30 is to separate native and soluble proteins from the coloring agent, such as annatto extract. Native and soluble proteins flow from the microfilter 30 as part of the microfiltration permeate 33 (or optionally the diafiltration permeate 35) and coloring agent, such as annatto extract, flows from the microfilter 30 as part of the microfiltration retentate 32 (or optionally the diafiltration retentate 34). A higher percentage of membrane transfer of native and soluble protein may be achieved by increasing the number of membrane stages in the microfilter 30. In this regard, the terms "microfilter" and "microfiltration" are to be broadly construed as any separation mechanism, such as a filtration mechanism, that is capable of permitting a substantial amount, such as at least about 30 weight percent, of the $\text{protein}_{N\&S(HPLC)}$ in the feed to the processing unit, such as the microfilter 30, to be transferred into a first stream, such as the microfiltration permeate 33, and to permit at least about 50 weight percent of the coloring agent, such as annatto extract, present in the feed to the processing unit, such as the microfilter 30, to be retained in a second stream, such as the microfiltration retentate 32.

Nonetheless, the microfilter 30, or an equivalent substitute therefor, is preferably capable of permitting at least about 50 weight percent of the $\text{protein}_{N\&S(HPLS)}$ in the feed to the microfilter 30 to be transferred into the microfiltration permeate 33 (or optionally the diafiltration permeate 35) and to permit at least about 80 weight percent of the coloring agent, such as annatto extract, present in the feed to the microfilter 30 to be retained in the microfiltration retentate 32 (or optionally the diafiltration retentate 34). More preferably, the microfilter 30, or an equivalent substitute therefor, is capable of permitting at least about 60 weight percent of the $\text{protein}_{N\&S(HPLS)}$ in the feed to the microfilter 30 to be transferred into the microfiltration permeate 33 (or optionally the diafiltration permeate 35) and to permit substantially all, such as at least about 99 weight percent, of the coloring agent, such as annatto extract, present in the feed to the microfilter 30 to be retained in the microfiltration retentate 32 (or optionally the diafiltration retentate 34).

The microfiltration membrane used in the microfilter 30 may be made of any suitable material that is capable of extended operating periods of at least about seven days and preferably at least about 30 days. Additionally, the material of the microfiltration membrane should be capable of substantially maintaining the pore size distribution and pore size range of the membrane during operating periods of at least about seven days and preferably during operating periods of at least 30 days.

Though the terms "microfilter" and "microfiltration" are defined herein in terms of separation capability with respect to the coloring agent and $\text{protein}_{N\&S(HPLC)}$ included in the feed to the microfilter 30, microfilter and microfiltration membranes are also discussed herein in terms of the molecular weight cut-off (MWCO) of particular membranes. Membrane MWCOs are characterized based on filtration of a clear aqueous solution containing molecules of a particular size. For example, when a 1,000,000 Dalton MWCO membrane is used to filter a clear aqueous solution containing only molecules with a molecular weight of 1,000,000 Dalton, by definition, 95 weight percent of the molecules will be retained by the membrane, while 5 weight percent of the molecules will pass through the membrane. Because the solution that is used to characterize the MWCO of the membrane contains only molecules with a molecular weight of approximately 1,000,000 Dalton, secondary membrane effects do not occur to a significant degree and therefore do not significantly affect the amount of the 1,000,000 Dalton MW molecules that are retained on the membrane.

Some examples of membranes that can serve as microfiltration membranes in accordance with the present invention include those membranes having a MWCO ranging from approximately 500,000 Dalton to approximately 1,000,000 Dalton. Preferably, the membrane of the microfilter 30 has a MWCO of greater than approximately 500,000 Dalton. Some examples of suitable microfiltration membrane materials for the microfilter 30 include polysulfone, polyvinyl diflouride (PVDF) and ceramic. Of these, PVDF and ceramic are preferred over polysulfone, and PVDF is preferred over ceramic.

PVDF is preferred over ceramic because ceramic membranes and seals associated with ceramic membranes have been found to require special care during operations. For example, ceramic membranes are relatively susceptible to cracking if temperature changes in the dairy or whey material are made too quickly, due to differential expansion rates within the ceramic material. Additionally, the seals associated with ceramic membranes require delicate torquing during installation to prevent damage to the seal that may permit leakage through the seal.

Ceramic and PVDF are preferred over polysulfone because ceramic and PVDF each have a more uniform pore size distribution than polysulfone membranes. Filtration membranes typically have a distinctive range of pore sizes that may be affected by the membrane material and the technique used to form the pores in the membrane. Exemplary microfiltration structures that may be used in practicing the method of the present invention are the AF series of membrane structures having a MWCO of approximately 1,000,000 Dalton and a nominal pore diameter in the range of about 0.05 microns to about 0.2 microns that are available from PTI Advanced Filtration, Inc. of San Diego, Calif.

The pore size distribution and the range of pore sizes directly affects the separation characteristics of a particular filtration membrane. The pore size range and distribution of a particular membrane substantially determines the range and distribution of particle size(s) that pass through the membrane. A particular membrane is better able to differentiate between particle sizes and make a sharper particle size cut when the membrane has a more uniform pore size distribution.

Polysulfone membranes have a less uniform pore size distribution than PVDF membranes. On the other hand, ceramic membranes have a more uniform pore size than PVDF membranes. When practicing the microfiltration portion of the present invention, it is desirable to maintain a sharper cut-off point between particles and molecules that permeate through the membrane versus particles and molecules that are retained on the membrane. For this reason, ceramic and PVDF membranes are preferred over polysulfone membranes. However, PVDF membranes are preferred over ceramic membranes due to the previously noted operational problems that may arise when ceramic membranes are used.

As noted, the present invention may generally incorporate membranes having MWCOs ranging from approximately 500,000 Dalton to approximately 1,000,000 Dalton. For example, the microfilter 30 may incorporate a membrane with a MWCO of about 500,000 Dalton. However, the microfilter 30 preferably incorporates a membrane with a MWCO greater than approximately 500,000 Dalton. Membranes with a MWCO greater than approximately 500,000 are preferred over about 500,000 Dalton MWCO membranes because about 500,000 Dalton MWCO membranes permit a significantly smaller amount of native and soluble protein into the microfiltration permeate 33, as compared to the amount of native and soluble protein allowed into the microfiltration permeate 33 by membranes with an MWCO greater than about 500,000 Dalton.

As stated above, when the approximately 1,000,000 Dalton MWCO membrane is used to filter a clear aqueous solution containing only molecules with a molecular weight of approximately 1,000,000 Daltons, 95 weight percent of the molecules will be retained by the membrane, while 5 weight percent of the molecules will pass through the membrane. Though the approximate 1,000,000 Dalton MWCO membrane may also be classified in terms of a nominal pore size, this nominal pore size designation is not necessarily an accurate determinant of the range of size or particles that will pass through the membrane. This inaccuracy arises because the nominal pore size designation does not take into account the range and distribution of membrane pore sizes. For this reason, membranes that each have a particular nominal pore size will not necessarily have the same molecular weight cut-off or the same filtration characteristics for a particular feed material.

Since membranes made of ceramic, PVDF, and polysulfone will each have different pore size ranges and distributions, the range and distribution of particle sizes that permeate through approximately 1,000,000 Dalton MWCO membranes which each a nominal pore diameter in the range of about 0.05 microns to about 0.2 microns will typically differ, depending upon the material the membrane is made of. Therefore, when seeking particular permeate characteristics, such as particles having a particular range and distribution of sizes, it is important to specify not only the MWCO of the membrane, but also the material the membrane is made of. Thus, as noted above, the preferred microfiltration membrane for the microfilter 30 has a MWCO greater than approximately 500,000 Daltons and is made of PVDF.

The temperature of the feed to and in the microfilter 30 may range from about 40° F. to about 140° F. The particular temperature selected depends on a number of different competing variables, such as coloring agent retention, fat retention, and native and soluble protein passage along with the amount of bacterial growth inhibition. Similar comments apply when diafiltration is practiced using the microfilter 30.

The filtration characteristics of the microfiltration membrane employed in the microfilter 30 are also pressure dependent. Any pressure may be maintained on the feed to the microfilter 30 proximate the microfiltration membrane and any pressure may be maintained on the microfiltration retentate 32 (or optionally the diafiltration retentate 34) downstream of the microfiltration membrane, so long as sufficient trans-membrane pressure drop exists to accomplish filtration. For example, the pressure on the feed to the microfiltration membrane may range from about 1 psig up to about 30 psig, while the pressure maintained on the microfiltration retentate 32 (or optionally the diafiltration retentate 34) from the microfiltration membrane may range from slightly under the feed pressure down to about 0 psig. Lower pressures on the feed to the microfiltration membrane on the order of about 20 psig or less are preferred to minimize the cost of building and maintaining the system that incorporates the microfiltration membrane.

Furthermore, it has been determined that lower trans-membrane pressure drops are preferred. For example, when the pressure on the microfiltration retentate 32 downstream of the microfiltration membrane is maintained at about 4.5 psig and the pressure on the microfiltration permeate 33 from the microfilter 30 is maintained at about 3 psig, the pressure on the feed proximate the microfiltration membrane is preferably about 18 psig or less. As used herein, trans-membrane pressure drop is equal to:

$$((P_{Feed}+P_{Retentate})/2)-P_{Permeate}$$

where $P_{Feed}$ is the pressure on the feed proximate the microfiltration membrane, $P_{Retentate}$ is the pressure on the microfiltration retentate 32 downstream of the microfiltration membrane, and $P_{Permeate}$ is the pressure on the microfiltration permeate 33 from the microfilter 30. Lower trans-membrane pressure drops are preferred because it has been found that transmission of native and soluble protein through the microfiltration membrane, along with retention of the coloring agent, such as annatto extract, on the microfiltration membrane, are generally enhanced at lower trans-membrane pressure drops of about 15 psig. It is believed that increases in the trans-membrane pressure drop above about 15 psig facilitate the formation of a secondary membrane proximate the microfiltration membrane.

Secondary membrane effects arise when aggregated particles of retained molecules form what is commonly referred to as a "secondary membrane" proximate the surface of the microfiltration membrane. This "secondary membrane" tends to act as a secondary control, beyond the primary control of the membrane pore size distribution, on the size of the particles that can pass through the microfiltration membrane. The secondary membrane effect is most pronounced when the flow of solution to be filtered is directed approximately perpendicular to the surface of the microfiltration membrane. Secondary membrane effects are substantially diminished when the flow of the solution to be filtered is directed tangentially along the filtration membrane surface so that any tendency for particles to build up proximate the filtration membrane is predominantly negated by a scrubbing or sweeping action of the tangentially directed solution. Any secondary membrane that forms tends to limit the percentage of native and soluble protein that permeates through the microfiltration membrane by preventing the native and soluble protein from reaching the membrane.

The membrane structure of the microfiltration membrane for the microfilter 30 may have a variety of configurations and designs, such as being planar in nature or spiral-wound in nature. Preferably, the microfiltration membrane is spiral-wound in construction, versus being planar in structure, because the spiral-wound structure permits placement of a larger amount of microfiltration membrane surface in a given volumetric space than is possible with the planar construction. Spiral-wound membranes may include any number of spiral layers ranging from two or three up to seventeen or eighteen or more. When the microfiltration membrane is spiral-wound in nature, the membrane is encased in a plastic mesh tube to keep the spiral-wound layers in place and for convenience of handling. The spiral-wound membrane and the encasing plastic mesh tube are inserted into a cylindrical metal cannister having an inlet for the feed and outlets for the permeate and retentate, prior to use. In relation to placement of the spiral-wound membrane in the cannister, all necessary precautions should be taken to minimize, and preferably eliminate, the possibility that any feed may bypass the spiral-wound membrane and thereby flow directly to either the permeate outlet or the retentate outlet without being acted upon by the spiral-wound membrane.

The ultrafilters 20, 36, 54, and 72 may each employ an ultrafiltration membrane with a MWCO cut-off of approximately 3,000 Daltons, since dairy product coloring agents typically have molecular weights on the order of about 1000 Daltons, or less, and native and soluble proteins typically have molecular weights greater than about 3,000 Daltons. One suitable ultrafiltration membrane with a MWCO cut-off of approximately 3,000 Daltons is available from Koch Membrane Systems of Wilmington, Mass. as an ABCOR® ultrafiltration membrane. Other suitable ultrafiltration membranes with a MWCO of approximately 3,000 Daltons are available from PTI Advanced Filtration, Inc. of San Diego, Calif.; from Synder Filtration of Vacaville, Calif.; and from Osmonics, Inc. of Minnetonka, Minn. Suitable ceramic ultrafiltration membranes are available from Ceraver of France and from U.S. Filter Corporation of Rockford, Ill. Additionally, suitable zirconium-coated ultrafiltration membranes are available from Rhone-Poulenc of France.

The performance of an ultrafiltration membrane, as measured by the ultrafiltration permeate, is primarily dictated by the surface area of the ultrafiltration membrane, by the characteristics of the feed to the ultrafiltration membrane, and by the feed side pressure maintained on the ultrafiltration membrane. The flow rate of ultrafiltration permeate from the ultrafilters 20, 36, 54, and 72 is thus controlled by the performance of the particular ultrafiltration membranes in the ultrafilters 20, 36, 54, and 72, respectively. Similar comments apply when diafiltration is practiced using the ultrafilters 20, 36, 54, and 72.

The back pressure may be controlled on the retentate from the ultrafilters 20, 36, 54, and 72 to attain a particular degree of ultrafiltration retentate concentration relative to the ultrafiltration feed. Alternatively, the flow rate of the retentate from the ultrafilters 20, 36, 54, and 72 may be controlled at a particular ratio with respect to the flow rate of the permeate from the ultrafilters 20, 36, 54, and 72 by controlling the back pressure on the ultrafiltration retentate.

For the ultrafilters 20, 36, 54, and 72, the inlet pressure on the feed to the ultrafilter and the discharge pressure on the ultrafiltration retentate may be maintained within a broad range of pressures to attain acceptable ultrafiltration results, so long as the selected pressures do not cause degradation of the particular ultrafiltration membrane being used. For example, the inlet pressure on the feed to the ultrafilter may be maintained between about 40 psig and about 120 psig, and the discharge pressure on the ultrafiltration retentate may be maintained between about 0 psig and about 60 psig, so long as the difference between the inlet pressure on the feed to the ultrafilter and the discharge pressure on the ultrafiltration retentate is greater than 0 psig and is preferably between about 40 psig and about 80 psig. For example, it would be acceptable in the course of practicing the present invention to maintain an inlet pressure of about 80 psig feed to the ultrafiltration unit while maintaining a discharge pressure of about 20 psig on the ultrafiltration retentate. Similar comments apply when diafiltration is practiced using the ultrafilters 20, 36, 54, and 72.

The temperature of the feed to and in the ultrafilters 20, 36, 54, and 72 may be maintained in the range of between about 40° F. and about 140° F., so long as the selected temperature does not cause degradation of the particular ultrafiltration membrane being used. For example, it would typically be acceptable to maintain the temperature of the feed to and in the ultrafilters 20, 36, 54, and 72 in the range of between about 55° F. and about 120° F. during ultrafiltration. Similar comments apply when diafiltration is practiced using the ultrafilters 20, 36, 54, and 72.

Figure 7:
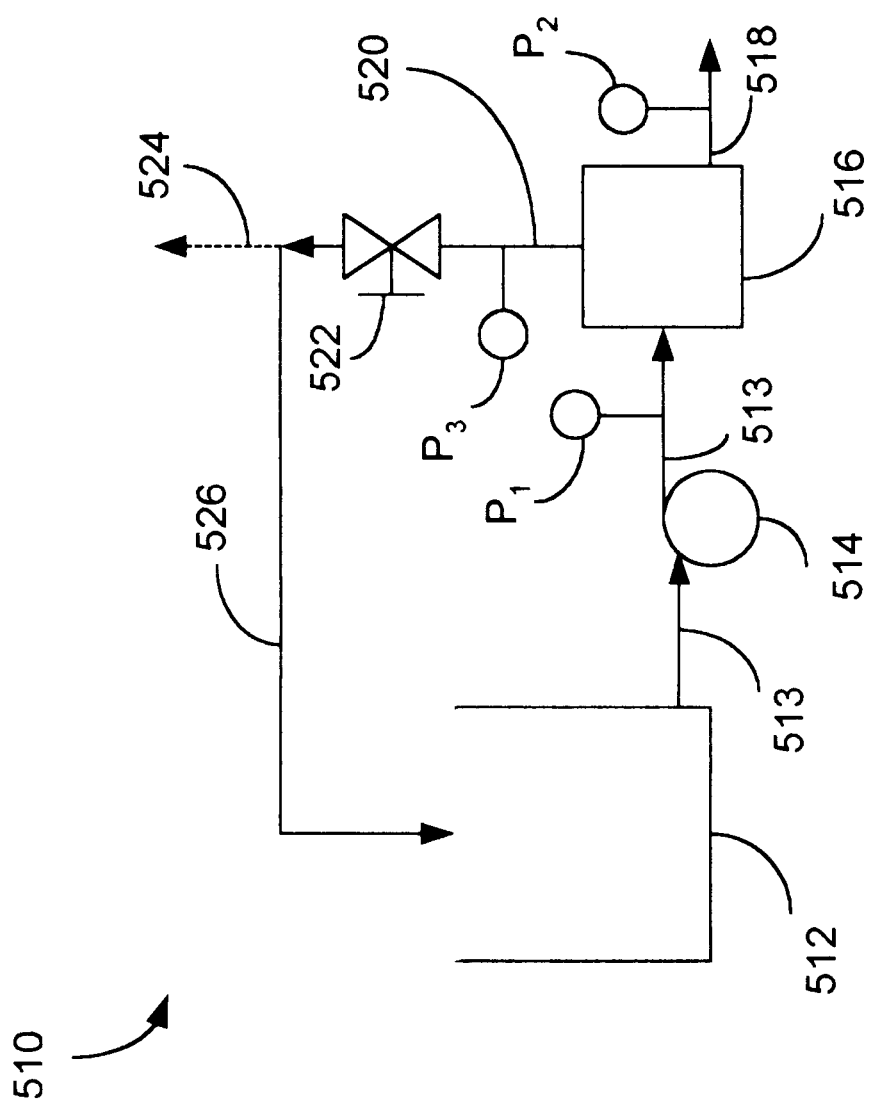
FIG. 7 is a block flow diagram depicting batch-wise filtration in accordance with the present invention.

Though not depicted in FIGS. 1 and 3–6, the microfilter 30 and the ultrafilters 20, 36, 54, and 72 may each be operated in either batch-wise fashion or in continuous mode. A batch-wise configuration suitable for use with the microfilter 30 and/or the ultrafilters 20, 36, 54, and/or 72 is generally depicted at 510 in FIG. 7. Any individual one of the microfilter 30, the ultrafilter 20, the ultrafilter 36, the ultrafilter 54, or the ultrafilter 72 may be operated in batch-wise fashion in accordance with the configuration 510. In the configuration 510, a tank 512 holds feed 513 that is transferred by a pump 514 at a pressure $P_1$ to a filtration unit 516. The filtration unit 516 may represent the microfilter 30, the ultrafilter 20, the ultrafilter 36, the ultrafilter 54, or the ultrafilter 72 in any particular application of the configuration 510. The filtration unit 516 filters the feed 513 to create a permeate 518 and a retentate 520.

The permeate 518 may flow freely from the filtration unit 516 or may be throttled by a valve (not shown) at a pressure $P_2$. Similarly, the retentate 520 may flow freely from the filtration unit 516 or may be throttled by a valve 522 at a pressure $P_3$. Beyond the valve 522, the retentate 520 may be discharged as retentate 524 from the configuration 510 for further processing in accordance with the present invention or may be recycled as retentate 526 to the tank 512 for further concentration in the filtration unit 516. Also, the permeate 518 and/or the retentate 520 may be blended with water for individual diafiltration in the filtration unit 516.

Any pressures $P_1$, $P_2$, and $P_3$ may be maintained, so long as sufficient trans-membrane pressure drop exists across the filter or membrane of the filtration unit 516 to accomplish filtration. For example, when the filtration unit 516 is a microfiltration unit, $P_1$ may range from about 1 psig up to about 30 psig, while $P_2$ and $P_3$ may range from slightly under $P_1$ down to about 0 psig. Lower $P_1$ pressures on the order of about 20 psig or less are preferred to minimize the cost of building and maintaining the configuration 510 that incorporates a microfiltration membrane in the filtration unit 516. As another example, when the filtration unit 516 is an ultrafiltration unit, $P_1$ and $P_2$ may be maintained within a broad range of pressures to attain acceptable ultrafiltration results, so long as the selected pressures do not cause degradation of the particular ultrafiltration membrane being used. For example, $P_1$ may be maintained at between about 40 psig and about 120 psig, and $P_3$ may be maintained between about 0 psig and about 60 psig, so long as $P_1-P_2$ is greater than 0 psig and is preferably between about 40 psig and about 80 psig.

Figure 8:
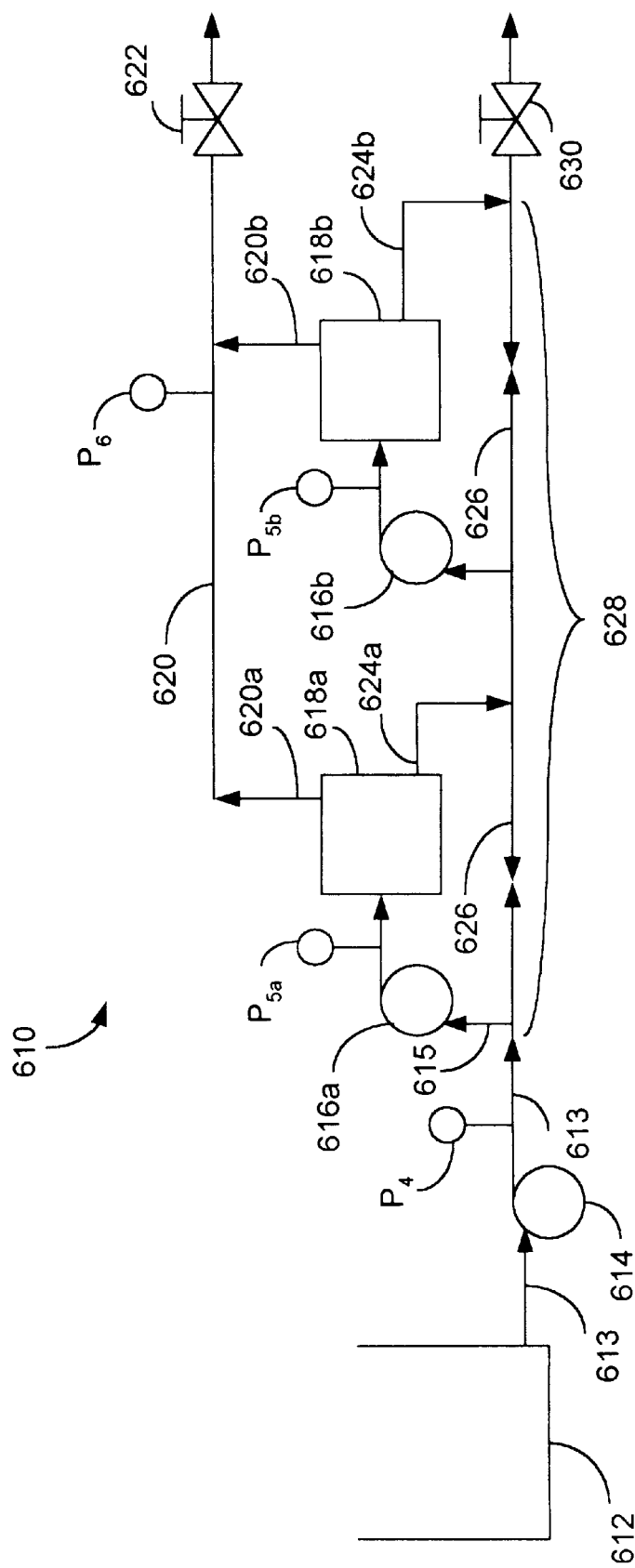
FIG. 8 is a block flow diagram depicting continuous filtration in accordance with the present invention.

A continuous configuration suitable for use with the microfilter 30 and/or the ultrafilters 20, 36, 54, and/or 72 is generally depicted at 610 in FIG. 8. Any individual one of the microfilter 30, the ultrafilter 20, the ultrafilter 36, the ultrafilter 54, or the ultrafilter 72 may be operated in continuous fashion in accordance with the configuration 610. In the configuration 610, a tank 612 holds feed 613 that is transferred by a pump 614 at a pressure $P_4$ to a pump 616*a* that transfers the feed 613, as part of a feed mix 615, to a filtration unit 618*a*. The filtration unit 618*a* may represent the microfilter 30, the ultrafilter 20, the ultrafilter 36, the ultrafilter 54, or the ultrafilter 72 in any particular application of the configuration 610. The filtration unit 618*a* filters the feed mix 615 to create a permeate 620*a* and a retentate 624*a*.

The permeate 620*a* may flow freely from the filtration unit 618*a* or may be throttled by a valve (not shown) at a pressure $P_6$. The retentate 624*a* flows into a retentate manifold 628 to form part of a retentate blend 626. When the filtration unit 618*a* is the only filtration unit in the configuration 610, the retentate 624*a* is the only retentate component of the retentate blend 626. The retentate 624*a* in the manifold 628 is throttled by a valve 630. The valve 630 may be set to permit discharge of none, some, or all of the retentate blend 626 from the manifold 628 and from the configuration 610 for further processing in accordance with the present invention. Any of the retentate blend 626 not exiting the system 610 through the valve 630 may be combined with the feed 613 to form the feed mix 615 prior to the pump 616*a* for further filtration in the filtration unit 618*a*.

The microfilter 30 may, in the continuous mode, consist of a single filtration unit or, alternatively, though not depicted in FIGS. 1 or 3–6, may consist of two or more individual filtration units arranged either in parallel or in series. Likewise, in the continuous mode, the ultrafilters 20, 36, 54, 72 may individually consist of a single filtration unit or, alternatively, though not depicted in any of FIGS. 1 or 3–6, may individually consist of two or more individual filtration units arranged either in parallel or in series. For example, the ultrafilter 20 could consist of one, two, three, or even four or more separate ultrafiltration units arranged either in series or parallel.

As an example, the configuration 610 could, in addition to employing the filtration unit 618*a*, employ a pump 616*b* that transfers retentate blend 626, pressurized to pressure $P_4$ by the pump 614, to a filtration unit 618*b*. The filtration unit 618*b* filters part of the retentate blend 626 to create a permeate 620*b* and a retentate 624*b*. The permeate 620*b* joins with the permeate 620*a* to form a permeate blend 620. As part of the permeate blend 620, the permeate 620*b* may flow freely from the filtration unit 618*b* or may be throttled at the pressure $P_6$.

The retentate 624*b* flows into the retentate manifold 628 to form part of the retentate blend 626 along with the retentate 624*a*. The retentate blend 626 in the manifold 628 is throttled by the valve 630. The valve 630 may be set to permit discharge of none, some, or all of the retentate blend 626 from the manifold 628 and from the configuration 610 for further processing in accordance with the present invention. Any of the retentate blend 626 not exiting the system 610 through the valve 630 may be transferred to the filtration unit 618*a* by the pump 616*a* or may be transferred the filtration unit 618*b* by the pump 616*b* for further processing.

Though the pump 616*a* is depicted as being located generally between the pump 614 and the pump 616*b* in the system 610, the pump 614 could be positioned between the pump 616*a* and the pump 616*b* to enhance distribution of the feed 613 between the filtration unit 618*a* and the filtration unit 618*b* as part of the retentate blend 626. Also, the permeate blend 620 (or the permeate 620*a* or the permeate 620*b*) and/or the retentate blend 626 (or the retentate 624*a* or the retentate 624*b*) may be blended with water for individual diafiltration in the filtration unit 618*a*, the filtration unit 618*b*, or in the configuration 610 that includes both the filtration unit 618*a* and the filtration unit 618*b*.

Any pressures $P_4$, $P_{5a}$, $P_{5b}$, and $P_6$ may be maintained, so long as sufficient trans-membrane pressure drop exists across the filter or membrane of the filtration unit 618a and 618b to accomplish filtration. For example, when the filtration units 618a and 618b are microfiltration units, $P_{5a}$ and $P_{5b}$ may range from about 1 psig up to about 30 psig, while $P_4$ and $P_6$ may range from slightly under $P_{5a}$ and $P_{5b}$ down to about 0 psig. Lower $P_{5a}$ and $P_{5b}$ pressures on the order of about 20 psig or less are preferred to minimize the cost of building and maintaining the configuration 610 that incorporates a microfiltration membrane in the filtration units 618a and 618b.

As another example, when the filtration units 618a and 618b are ultrafiltration units, $P_1$ and $P_2$ ultrafiltration may be maintained within a broad range of pressures to attain acceptable ultrafiltration results, so long as the selected pressures do not cause degradation of the particular ultrafiltration membrane being used. For example, $P_4$ and $P_6$ may range from slightly under $P_{5a}$ and $P_{5b}$ down to about 0 psig. Preferably, $P_{5a}$ and $P_{5b}$ are between about 40 psig and about 120 psig, and $P_6$ is maintained between about 0 psig and about 60 psig, so long as $P_{5a}-P_6$ and $P_{5b}-P_6$ is greater than 0 psig and is preferably between about 40 psig and about 80 psig.

Various analytical techniques and calculation techniques are employed herein. An explanation of these techniques and calculations follows. All determinations are on a wet basis, without drying the sample, unless otherwise specified below.

PROPERTY DETERMINATION AND CHARACTERIZATION TECHNIQUES

To determine the weight percent total solids, wet basis, in a sample, the actual weight of total solids was determined by analyzing the sample in accordance with Method #925.23 (33.2.09) of Official Methods of Analysis, Association of Official Analytical Chemists (AOAC) (16th Ed., 1995). The weight percent total solids, wet basis, was then calculated by dividing the actual weight of total solids by the actual weight of the sample.

To determine the percent of total protein, wet basis, in a sample, the actual weight of total protein was determined in accordance with Method #991.20 (33.2.11) of Official Methods of Analysis, Association of Official Analytical Chemists (AOAC) (16th Ed., 1995). The value determined by the above method yields "total Kjeldahl nitrogen," which is equivalent to "total protein" since the above method incorporates a factor that accounts for the average amount of nitrogen in protein. Since any and all total Kjeldahl nitrogen determinations presented herein are based on the above method, the terms "total Kjeldahl nitrogen" and "total protein" are used interchangeably herein. Furthermore, those skilled in the art will recognize that the term "total Kjeldahl nitrogen" is generally used in the art to mean "total protein" with the understanding that the factor has been applied. The weight percent total protein, wet basis, is calculated by dividing the actual weight of total protein by the actual weight of the sample. To determine the weight percent of total protein, dry basis, in the sample, the wet basis weight percent of total solids in the sample is determined in accordance with the previously described total solids procedure and the weight percent of total protein, wet basis, is divided by the weight percent of total solids to yield the weight percent of total protein, dry basis, in the sample.

The weight percent of true protein, wet basis, for a particular sample is calculated after first determining the wet basis weight percent of total Kjeldahl nitrogen and the wet basis weight percent of non-protein nitrogen in the sample. The wet basis weight percent of total Kjeldahl nitrogen in the sample is determined using the method referenced above. The wet basis weight percent of non-protein nitrogen (NPN) in the sample is determined in accordance with Method #991.21 (33.2.12) of Official Methods of Analysis, Association of Official Analytical Chemists (AOAC) (16th Ed., 1995). The weight percent of true protein, wet basis, in the sample is then determined by subtracting the wet basis weight percent of non-protein nitrogen in the sample from the wet basis weight percent of total Kjeldahl nitrogen in the sample. To determine the weight percent of true protein, dry basis, in the sample, the weight percent of total solids in the sample is determined in accordance with the previously described total solids procedure and the weight percent of true protein, wet basis, is divided by the weight percent of total solids to yield the weight percent of true protein, dry basis, in the sample.

The weight percent whey protein nitrogen (WPN), wet basis, in a particular sample, is determined in accordance with the Standards for Grades of Dry Milk, American Dry Milk Industry (1971 ed.). To determine the weight percent of whey protein nitrogen, dry basis, in the sample, the weight percent of total solids is determined in accordance with the previously described total solids procedure and the weight percent of whey protein nitrogen, wet basis, is divided by the weight percent of total solids to yield the weight percent of whey protein nitrogen, dry basis, in the sample.

As specified previously, the term "$protein_{N\&S(HPLS)}$", as used herein, refers collectively to a group of four particular proteins (β-lactoglobulin, α-lactalbumin, immunoglobulin G, and bovine serum albumin) that have not been denatured. The wet basis concentrations, by volume, of β-lactoglobulin, α-lactalbumin, immunoglobulin G, and bovine serum albumin in samples were determined herein using High Pressure Liquid Chromatography. A Waters High Pressure Liquid Chromatography system employing a Waters M-6000A high pressure pump, a Waters 710B WISP automatic sample injection system, and a Waters 490E programmable multi-wavelength detector was used. The Waters High Pressure Liquid Chromatography system employing the specified components may be obtained from Waters Corporation of Milford, Mass. In the Waters HPLC system, the Waters 490E programmable multiwavelength detector was set at 280 nanometers. The stationary phase of the chromatographic system was a 300 mm×7.8 mm Bio-Sil SEC 125 size exclusion column obtained from Bio-Rad Corp. of Hercules, Calif. The mobile phase of the chromatographic system was a solution of 0.1M sodium sulfate and 0.1 M sodium phosphate with a pH of 6.0. Volumetric standards for β-lactoglobulin, α-lactalbumin, immunoglobulin G, and bovine serum albumin were obtained from Sigma Chemical Company of St. Louis, Mo. The sample flow rate in the system was set at 1.0 ml/minute.

Peak area data were collected using the EZ Chrom Chromatography Data System that is available from Scientific Software, Inc. of San Ramon, Calif. Using the peak area data for the sample and the volumetric standards for β-lactoglobulin, α-lactalbumin, immunoglobulin G, and bovine serum albumin, the EZ Chrom Chromatography Data System calculated the volumetric concentrations of β-lactoglobulin, α-lactalbumin, immunoglobulin G, and bovine serum albumin in the sample. After the volumetric concentrations of β-lactoglobulin, α-lactalbumin, immunoglobulin G, and bovine serum albumin were determined, the concentrations of these four soluble proteins were added together to determine the concentration, by volume, of $protein_{N\&S(HPLC)}$ in the sample under consideration.

To determine the weight percent benzoic acid, wet basis, in a sample, the actual weight of benzoic acid in the sample was determined in accordance with Method #974.10 (47.3.37) of Official Methods of Analysis, Association of Official Analytical Chemists (AOAC) (16th Ed., 1995). The weight percent benzoic acid, wet basis, was then calculated by dividing the actual weight of benzoic acid by the actual weight of the sample. To determine the weight percent of benzoic acid, dry basis, in the sample, the weight percent of benzoic acid in the sample is determined in accordance with the previously described total solids procedure and the weight percent of benzoic acid, wet basis, is divided by the weight percent of total solids to yield the weight percent of benzoic acid, dry basis, in the sample.

To determine the weight percent lactose, wet basis, in a sample, the actual weight of lactose in the sample was determined using analysis kit number 176–303, that is available from Boehringer-Mannheim of Indianapolis, Ind. in accordance with the procedural instructions included with analysis kit number 176–303. The weight percent lactose, wet basis, was then calculated by dividing the actual weight of lactose in the sample by the actual weight of the sample. To determine the weight percent of lactose, dry basis, in the sample, the weight percent of lactose in the sample is determined in accordance with the previously described total solids procedure and the weight percent of lactose, wet basis, is divided by the weight percent of total solids to yield the weight percent of lactose, dry basis, in the sample.

To determine the weight percent fat, wet basis, in a sample, the actual weight of fat in the sample was determined in accordance with Method #974.09 (33.7.18) of Official Methods of Analysis, Association of Official Analytical Chemists (AOAC) (16th Ed., 1995). The weight percent fat, wet basis, was then calculated by dividing the actual weight of fat in the sample by the actual weight of the sample. To determine the weight percent of fat, dry basis, in the sample, the weight percent of fat in the sample is determined in accordance with the previously described total solids procedure and the weight percent of fat, wet basis, is divided by the weight percent of total solids to yield the weight percent of fat, dry basis, in the sample.

Determinations of percent total solids, in a particular sample, on the Brix scale, were determined using an Atago Model 2110 hand-held refractometer that is manufactured by Atago Co., Ltd. of Japan, and is available in the United States from Vee Gee Scientific, Inc. of Kirkland, Wash., in accordance with the procedural instructions included with the Model 2110 hand-held refractometer.

REFLECTANCE SPECTRA

The color of any of the streams present in any of the processes 10, 110, 210, 310, or 410 may be characterized in terms of L* (lightness/darkness), a*(redness/greenness), and b* (yellowness/blueness) values in the CIELAB colorspace. Increasing L* values (L* moves toward +100) correlate to increasing lightness (increasing "whiteness"); increasing a* values (a* moves toward +60 and thereby becomes either more positive or less negative) correlate to increasing redness; and increasing b* values (b* moves toward +60 and thereby becomes either more positive or less negative) correlate to increasing yellowness. Correspondingly, decreasing L* values (L* moves toward 0) correlate to decreasing lightness (increasing "blackness"); decreasing a* values (a* moves toward −60 and thereby becomes either less positive or more negative) correlate to increasing greenness (decreasing "redness"); and decreasing b* values (b* moves toward −60 and thereby becomes either less positive or more negative) correlate to increasing blueness (decreasing "yellowness"). It is believed that the a* variable best reflects the removal of visible color caused by annatto extract.

Color differences between two samples of a particular stream or between samples of different streams may be determined using the following equation:

$$\Delta E^*_{ab} = [(\Delta L^*)^2 + (\Delta a^*)^2 + (\Delta b^*)^2]^{0.5}.$$

The numerical value found by calculating $\Delta E^*_{ab}$ indicates the size of the color difference between the two samples, but does not characterize how the colors of the two samples are different. When $\Delta E^*_{ab}$ is about 5 or less, the differences in color between the two samples being compared are typically unable to be visually recognized by people with good eyesight.

Unless otherwise indicated, all reflectance spectra recited herein were determined in accordance with or are based upon the following procedure that relies on a commercially available reflectometer, the Hunter LabScan II Colorimeter, that is available from Hunter Associates Laboratory, Inc ("Hunter") of Reston, Va. A white calibration standard, part number 11-010850, and a black calibration standard, part number 11-005030, each available from Hunter, were used to calibrate the Hunter LabScan II Colorimeter. Spectral data obtained by the Hunter LabScan II Colorimeter are converted by the Colorimeter into various spectral values, including the CIELAB colorspace variables: L* (lightness), a*(redness/greenness), and b* (yellowness/blueness).

Before the reflectance spectra are evaluated for a particular sample, the Hunter LabScan II Colorimeter is calibrated to the appropriate calibration standards supplied by Hunter. First, the Colorimeter takes a reading after being placed against the white calibration standard (part number 1-010850) supplied by Hunter. Then, the Colorimeter another reading after being placed against the black calibration standard (part number 11-005030) supplied by Hunter. The Colorimeter software then evaluates the two readings and makes any necessary calibration adjustments before reflectance spectra of samples are measured.

The reflectance spectrum of a particular dried sample (spray-dried or freeze-dried to less than 5% moisture, by weight) is evaluated by placing a powder cup (filled about 1 to 2 centimeters high with the sample) on the Hunter LabScan II Colorimeter measurement window. A suitable powder cup may be obtained from Agtron Instruments, a division of Magnuson Engineers, Inc., of San Jose, Calif. The Colorimeter is programed to characterize spectral data in terms of L*, a*, and b*. Determination of the L*, a*, and b* values for a particular dried sample entails five separate measurements of spectral data. Thus, the L*, a* and b* values for each dried sample are based on an average of five separate spectral measurements.

The reflectance spectra of a particular liquid sample is evaluated after placing the liquid sample in a sample cup and then placing the sample cup on the Hunter LabScan II Colorimeter measurement window. A suitable sample cup for the liquid sample may be obtained from Agtron Instruments of San Jose, Calif. A white reflectance disk and ring set that are available from Hunter are used in conjunction with the liquid filled cell in accordance with instructions available from Hunter to qualitatively characterize light that is reflected back to the Colorimeter by the reflectance disk after passing from the Colorimeter through the sample. The Colorimeter is programed to characterize spectral data in terms of L*, a*, and b*. Determination of the L*, a*, and b* values for a particular liquid sample entails five separate measurements of spectral data. Thus, the L*, a* and b* values for each liquid sample are based on an average of five separate spectral measurements.

TRANSMISSION SPECTRA

The visible transmission spectra of various liquid streams are evaluated using a Beckman DU-50 spectrophotometer that is available from Beckman Instruments of Fullerton, Calif. Calibration of the DU-50 spectrophotometer is done in accordance with instructions provided with the DU-50 spectrophotometer using deionized, reverse osmosis water. Evaluation of the visible transmission spectra of the various liquid streams is done in accordance with instructions provided by Beckman with the DU-50 spectrophotometer using a cuvette having an internal diameter of 10 millimeters.

EXAMPLES

The present invention is more particularly described in the following examples which are intended as illustrations only since numerous modifications and variations within the scope of the present invention will be apparent to those skilled in the art.

Example 1

The microfiltration (see Part B of this Example), subsequent ultrafiltration and diafiltration (see Parts C and D of this Example), and bleaching (see Part E of this Example) aspects of this Example were conducted in accordance with the schematic drawing of FIG. 1. Therefore, the terminology used in Parts B–E of Example 1 mirrors the terminology used with reference to FIG. 1.

Example 1—Part A

Cheddar cheese whey derived from the manufacture of colored cheddar cheese was ultrafiltered to form a whey protein concentrate containing approximately 35% total protein by weight on a dry basis. Both the cheddar cheese whey and the whey protein concentrate contained annatto extract and were orange in color. The whey protein concentrate was immediately cooled to about 40° F. after production and was placed in 240 gallon portable tanks. The portable tanks were held at about 40° F. while awaiting microfiltration. The pH of the whey protein concentrate was between about 6.2 and 6.4 standard pH units which indicates that good handling procedures were observed.

Example 1—Part B

This part of Example 1 illustrates the microfiltration aspect of the present invention. The whey protein concentrate obtained in Part A of Example 1 was microfiltered in continuous mode in microfilter 30 without any addition of dilution water. Additionally, no diafiltration was conducted on the microfiltration retentate, which was orange in color and contained annatto extract.

The microfilter 30 consisted of an AF-series microfiltration membrane structure obtained from PTI Advanced Filtration, Inc. of San Diego, Calif. that was positioned in a microfiltration cannister. The membrane of the microfiltration membrane structure was manufactured of polyvinyl diflouride (PVDF) with a molecular weight cut-off (MWCO) of about 1,000,000 daltons and a nominal pore diameter in the range of about 0.05 microns to about 0.2 microns. The AF-series membrane structure included about 17 to 18 spirals of the membrane fabric. The distance between facing spirals of the fabric was about 65 mils.

The flow rate of the microfiltration retentate 32 was set to be about 25%, by volume, of the microfiltration permeate 33 flow rate by controlling the back pressure on the microfiltration retentate 32. Thus, the volume of the microfiltration retentate 32 in this example was concentrated about five times versus the volume of the whey protein concentrate that was used as feed to the microfilter 30. The microfilter 30 was operated to maintain less than about 18 psig inlet pressure to the membrane structure and the back pressure on the microfiltration retentate 32 was determined to be about 3 psig. The temperature of the feed entering the microfilter 30 was maintained between about 40° F. and about 140° F.

Example 1—Part C

This portion of Example 1 demonstrates the ultrafiltration and subsequent diafiltration of the microfiltration retentate 32 obtained in Part B of this Example. The ultrafiltration unit 36 employed an ABCOR spiral wound membrane with a molecular weight cut-off of about 3,000 that is available from Koch Membrane Systems of Wilmington, Mass. The microfiltration retentate 32 was processed in the ultrafiltration unit 36 without any addition of dilution water to form the ultrafiltration retentate 38 and ultrafiltration permeate 40. The ultrafiltration retentate 38 was colored orange and contained a majority of the annatto extract originally present in the microfiltration retentate 32; correspondingly, the ultrafiltration permeate 40 was colored only slightly orange and contained a minority of the annatto extract originally present in the microfiltration retentate 32.

The flow rate of the ultrafiltration retentate 38 was set, relative to the ultrafiltration permeate 40 flow rate, to attain a total solids content in the ultrafiltration retentate 38 of about 30 weight percent, on the Brix scale, by controlling the back pressure on the ultrafiltration retentate 38 discharge. During this phase of ultrafiltration, an inlet pressure of about 80 psig was maintained on the microfiltration retentate 32 feed to the ultrafiltration unit 36 and the discharge pressure on the ultrafiltration retentate 38 was measured to be about 20 psig. The temperature of the microfiltration retentate 32 feed in the ultrafiltration unit 36 was maintained in the range of between about 55° F. and about 120° F. during this ultrafiltration step.

After this initial ultrafiltration step, the ultrafiltration retentate 38 was diafiltered in the ultrafiltration unit 36 to form the diafiltration retentate 42 and the diafiltration permeate 44 by continuously adding dilution water to the ultrafiltration retentate 38 feed until the total solids concentration of the diafiltration permeate 44 dropped to about 0.6% (about 0.6° Brix). The diafiltration retentate 42 was collected, cooled to about 40° F. and held overnight. The diafiltration retentate 42 was colored orange and contained a majority of the annatto extract originally present in the ultrafiltration retentate 38; correspondingly, the diafiltration permeate 44 was only faintly orange and contained a minority of the annatto extract originally present in the ultrafiltration retentate 38.

Example 1—Part D

This portion of Example 1 demonstrates the ultrafiltration and subsequent diafiltration of the microfiltration permeate 33 obtained in Part B of this Example. The ultrafiltration unit 54 employed an ABCOR spiral wound membrane with a molecular weight cut-off of about 3,000 that is available from Koch Membrane Systems of Wilmington, Mass. The microfiltration permeate 33 was processed in the ultrafiltration unit 54 without any addition of dilution water to form the ultrafiltration retentate 56 and ultrafiltration permeate 58. The ultrafiltration retentate 56 was faintly colored orange and contained a majority of the annatto extract originally present in the microfiltration permeate 33; correspondingly, the ultrafiltration permeate 58 was not visually observed to have any orange color and contained a minority, if any, of the annatto extract originally present in the microfiltration permeate 33.

The flow rate of the ultrafiltration retentate 56 was set, relative to the ultrafiltration permeate 58 flow rate, to attain a total solids content in the ultrafiltration retentate 56 of about 30 weight percent, on the Brix scale, by controlling the back pressure on the ultrafiltration retentate 56 discharge. During this phase of ultrafiltration, an inlet pressure of about 80 psig was maintained on the microfiltration permeate 33 feed to the ultrafiltration unit 54 and the discharge pressure on the ultrafiltration retentate 56 was measured to be about 20 psig. The temperature of the microfiltration permeate 33 feed in the ultrafiltration unit 54 was maintained in the range of between about 55° F. and about 120° F. during this ultrafiltration step.

After this initial ultrafiltration step, the ultrafiltration retentate 56 was diafiltered in the ultrafiltration unit 54 to form the diafiltration retentate 60 and the diafiltration permeate 62 by continuously adding dilution water to the ultrafiltration retentate 56 feed until the total solids concentration of the diafiltration permeate 62 dropped to about 0.6% (about 0.6° Brix). The diafiltration retentate 60 was collected, cooled to about 40° F. and held overnight. The diafiltration retentate 60 was faintly colored orange and contained a majority of the annatto extract originally present in the ultrafiltration retentate 56; correspondingly, the diafiltration permeate 62 was not visually observed to have any orange color and contained a minority of the annatto extract originally present in the ultrafiltration retentate 56.

Example 1—Part E

This step of Example 1 demonstrates the bleaching of the diafiltration retentate 42 to oxidize the annatto extract contained in the diafiltration retentate 42. Specifically, 250 lbs. of the diafiltration retentate 42 was placed in a reactor tank and heated to 135° F. under moderate agitation sufficient to substantially maintain plug flow conditions in the reactor tank. Then, 1.875 lbs. of OXYLITE® type XX bleaching powder was added to the agitated and heated diafiltration retentate 42. This yielded a concentration of about 0.75 weight percent OXYLITE® type XX bleaching powder, based on the total weight of the diafiltration retentate 42 and the OXYLITE® type XX bleaching powder in the reactor tank.

The 135° F. temperature and agitation was maintained on the mixture in the reactor tank for about one hour. About fifteen minutes after the OXYLITE® type XX bleaching powder was added to the reactor tank, a sample of bleached diafiltration retentate 52 was taken. This 15 minute bleached sample was visually observed to have no discernable orange color. A sufficient amount of this 15 minute bleached sample was blended with a sufficient amount of the diafiltration retentate 60 produced in Part D of this Example to yield a blend (reduced color whey product) containing about 80% total protein by weight, on a dry basis, and about 6% fat by weight, on a dry basis. This reduced color whey product that was based on the 15 minute bleached sample was visually observed to have no discernable orange color.

Additionally, at about 60 minutes after addition of the OXYLITE® type XX bleaching powder, another sample of the bleached diafiltration retentate 52 was taken. This 60 minute bleached sample was visually observed to have no discernable orange color. A sufficient amount of this 60 minute bleached sample was blended with a sufficient amount of the diafiltration retentate 60 produced in Part D of this Example to produce a blend (reduced color whey product) containing about 80% total protein by weight, on a dry basis, and about 6% fat by weight, on a dry basis. This reduced color whey product that was based on the 60 minute bleached sample was visually observed to have no discernable orange color. Both the 15 minute and 60 minute blends (reduced color whey product) were then spray dried to less than 5% moisture, by weight Various parameters of many of the streams mentioned above were analyzed in accordance with the test methods and concentration basis described above in the property characterization section of this document. The examples are identified in Table I below as follows: Sample 1: microfiltration retentate 32; Sample 2: diafiltration retentate 60; Sample 3: ultrafiltration retentate 38; Sample 4: diafiltration retentate 42; Sample 5: bleached diafiltration retentate 52 sample obtained after fifteen minutes of bleaching; Sample 6: blend (reduced color whey product) of Sample 5 and Sample 2; Sample 7: bleached diafiltration retentate 52 obtained after 60 minutes of bleaching; and Sample 8: blend (reduced color whey product) of Sample 7 and Sample 2.

TABLE I

|  | Sample No. 1 | Sample No. 2 | Sample No. 3 | Sample No. 4 | Sample No. 5 | Sample No. 6 | Sample No. 7 | Sample No. 8 |
| --- | --- | --- | --- | --- | --- | --- | --- | --- |
| Weight % Benzoic Acid (wet basis) | ND | ND | ND | ND | <0.01 | 0.20 | 0.22 | 0.05 |
| Weight % Fat (wet basis) | 3.20 | 0.18 | 5.30 | 6.14 | 6.04 | 1.66 | 6.10 | 1.63 |
| Weight % Total Protein (wet basis) | 10.39 | 26.25 | 16.45 | 18.55 | 18.38 | 24.60 | 18.50 | 24.35 |
| Weight % Total Solids (wet basis) | 18.63 | 28.25 | 26.18 | 26.07 | 26.65 | 27.98 | 26.72 | 27.95 |

ND: Parameter not determined because bleaching powder was not added to stream from which this sample was taken.

Next, the L*, a*, and b* values from the CIELAB color space were determined in accordance with the technique described above in the property characterization section of this document for spray dried forms of five streams mentioned previously in this example. In Table H below, the L*, a*, and b* values that are provided were determined, using the Hunter LabScan II Colorimeter, on the liquid forms of Samples 1 and 5–8. The testing methods for determining the L*, a*, and b* values presented in presented in Table II are described above in the property characterization section of this document.

TABLE II

|    | Spray Dried Form of Sample No. 1 | Spray Dried Form of Sample No. 5 | Spray Dried Form of Sample No. 6 | Spray Dried Form of Sample No. 7 | Spray Dried Form of Sample No. 8 |
|----|----|----|----|----|----|
| L* | 58.95 | 68.86 | 62.01 | 70.70 | 63.64 |
| a* | 13.38 | 1.74  | 1.17  | 1.09  | 1.14  |
| b* | 31.70 | 19.20 | 19.06 | 18.73 | 19.40 |

Comparison of the L*, a*, and b* values obtained in Samples 5–8 versus those obtained for Sample 1 readily illustrate that the bleached diafiltration retentate 52 of Sample 5, the Sample 6 blend of the Sample 5 bleached diafiltration retentate 52 and the Sample 2 diafiltration retentate 60, the bleached diafiltration retentate 52 of Sample 7, and the Sample 8 blend of the Sample 7 bleached diafiltration retentate 52 and the Sample 2 diafiltration retentate 60 each have reduced color, as compared to the non-bleached microfiltration retentate 32 of Sample 1. First, the L* values ranging from 62.01 to 70.70 for Samples 5–8 indicate that Samples 5–8 are each significantly and desirably lighter than the non-bleached microfiltration retentate 32 of Sample 1 that had the L* value of 58.95. Next, the a* values ranging from 1.09 to 1.74 for Samples 5–8 indicate that Samples 5–8 are each significantly and desirably less red than the non-bleached microfiltration retentate 32 of Sample 1 that had the a* value of 13.38. Finally, the b* values ranging from 18.73 to 19.40 for Samples 5–8 indicate that Samples 5–8 are each significantly and desirably less yellow than the non-bleached microfiltration retentate 32 of Sample 1 that had the b* value of 31.70.

Examples 2–22

These examples are presented for purposes of demonstrating the effect of different bleaching times, different bleaching temperatures, and different bleaching concentrations on various parameters of bleached diafiltration retentate 52. The microfiltration, subsequent ultrafiltration and diafiltration, and bleaching aspects of this Example were conducted in accordance with the schematic drawing of FIG. 1. Therefore, the terminology used in Examples 2–22 mirrors the terminology used with reference to FIG. 1.

A sample of cheese whey that was colored orange and contained annatto extract was processed in the ultrafiltration unit and the microfiltration unit 30 as described in Parts A and B of Example 1. Then the microfiltration retentate 32, analogous to the microfiltration retentate 32 produced in Part B of Example 1, was ultrafiltered and diafiltered in the same fashion in the ultrafiltration unit 36, as described in Part C of Example 1. The only processing difference between Example 1 and these examples is that the cheese whey of Example 1 and the cheese whey used as the starting material of these examples was obtained at a different time from the cheese whey source and therefore may have differed slightly in composition, though the cheese whey used in these Examples and in Example 1 all contained annatto extract and were colored orange.

In these examples, Example 2 refers to the diafiltration retentate 42, prior to bleaching, that is similar to the diafiltration retentate 42 obtained in Part C of Example 1 (referred to as Sample 4 in Example 1). Examples 3–22 represent bleached forms of the diafiltration retentate 52 of Example 2 after different periods of bleaching at different bleaching temperatures using different concentrations of bleach.

In Table III, various properties of the non-bleached diafiltration retentate 42 of Example 2 and of the bleached diafiltration retentates 52 of Examples 3–22 are presented for the as-obtained liquid forms of these retentates. In Table III, the L*, a*, and b* values that are provided were determined, using the Hunter LabScan II Colorimeter, on the liquid form of the diafiltration retentate 42 of Example 2, prior to bleaching, and on liquid forms of the diafiltration retentates 52 of Examples 3–22, after bleaching. The testing methods for these properties presented in Table III are described above in the property characterization section of this document.

TABLE III

| Example No. | Bleaching Period [minutes] | Bleaching Temp. [F.] | Bleach # Concentration [wt. %] (wet basis) | L* | a* | b* | $\alpha$ lactalbumin (vol. %) (wet basis) | $\beta$ lactoglobulin (vol. %) (wet basis) | IgG (vol. %) (wet basis) | BSA (vol. %) (wet basis) | protein$_{NAS(HPLG)}$ (wet basis) (vol. %) | Total Protein (wt. %) (dry basis) |
|----|----|----|----|----|----|----|----|----|----|----|----|----|
| 2  | 0  | N/A | N/A  | 65.58 | 11.86 | 33.21 | 0.615 | 3.620 | 1.515 | 0.970 | 6.72 | 14.61 |
| 3  | 15 | 140 | 0.25 | 73.80 | 2.68  | 33.21 | 0.490 | 3.015 | 1.230 | 0.785 | 5.52 | N/M |
| 4  | 30 | 140 | 0.25 | 74.50 | 2.24  | 33.19 | 0.480 | 2.885 | 1.205 | 0.800 | 5.37 | N/M |
| 5  | 45 | 140 | 0.25 | 74.83 | 2.07  | 33.21 | 0.490 | 3.010 | 1.250 | 0.825 | 5.58 | N/M |
| 6  | 60 | 140 | 0.25 | 74.75 | 1.97  | 33.21 | 0.480 | 2.950 | 1.240 | 0.825 | 5.50 | N/M |
| 7  | 15 | 140 | 0.75 | 74.25 | 2.23  | 19.81 | 0.545 | 3.340 | 1.450 | 0.950 | 6.29 | N/M |
| 8  | 30 | 140 | 0.75 | 75.41 | 1.57  | 18.95 | 0.475 | 2.755 | 1.200 | 0.815 | 5.25 | N/M |
| 9  | 45 | 140 | 0.75 | 76.28 | 1.31  | 23.16 | 0.425 | 2.505 | 1.090 | 0.740 | 4.76 | N/M |
| 10 | 60 | 140 | 0.75 | 77.49 | 1.18  | 23.93 | 0.415 | 2.520 | 1.085 | 0.740 | 4.76 | N/M |
| 11 | 15 | 130 | 0.75 | 73.91 | 2.10  | 19.26 | 0.640 | 3.460 | 1.640 | 1.150 | 6.89 | N/M |
| 12 | 30 | 130 | 0.75 | 74.84 | 1.83  | 17.99 | 0.610 | 3.365 | 1.580 | 1.125 | 6.68 | N/M |
| 13 | 45 | 130 | 0.75 | 75.32 | 1.67  | 21.81 | 0.625 | 3.465 | 1.640 | 1.165 | 6.90 | N/M |
| 14 | 60 | 130 | 0.75 | 75.51 | 1.64  | 23.49 | 0.595 | 3.200 | 1.555 | 1.100 | 6.45 | N/M |
| 15 | 15 | 130 | 1.00 | 73.81 | 2.00  | 17.64 | 0.675 | 3.595 | 1.735 | 1.245 | 7.25 | N/M |
| 16 | 30 | 130 | 1.00 | 75.33 | 1.71  | 23.26 | 0.575 | 3.230 | 1.535 | 1.080 | 6.42 | N/M |
| 17 | 45 | 130 | 1.00 | 76.19 | 1.40  | 20.91 | 0.560 | 3.320 | 1.585 | 1.120 | 6.59 | N/M |
| 18 | 60 | 130 | 1.00 | 76.53 | 1.26  | 18.69 | 0.520 | 2.935 | 1.440 | 1.015 | 5.91 | N/M |
| 19 | 15 | 135 | 1.25 | 74.92 | 1.82  | 18.64 | 0.555 | 3.125 | 1.455 | 1.030 | 6.17 | N/M |

TABLE III-continued

| Example No. | Bleaching Period [minutes] | Bleaching Temp. [F.] | Bleach # Concentration [wt. %] (wet basis) | L* | a* | b* | α lactalbumin (vol. %) (wet basis) | β lactoglobulin (vol. %) (wet basis) | IgG (vol. %) (wet basis) | BSA (vol. %) (wet basis) | protein$_{NAS(HPLG)}$ (wet basis) (vol. %) | Total Protein (wt. %) (dry basis) |
|---|---|---|---|---|---|---|---|---|---|---|---|---|
| 20 | 30 | 135 | 1.25 | 76.34 | 1.45 | 17.82 | 0.495 | 2.930 | 1.385 | 0.965 | 5.78 | N/M |
| 21 | 45 | 135 | 1.25 | 78.04 | 1.15 | 20.72 | 0.450 | 2.780 | 1.305 | 0.970 | 5.51 | N/M |
| 22 | 60 | 135 | 1.25 | 78.42 | 0.66 | 23.40 | 0.375 | 2.265 | 1.020 | 0.310 | 4.47 | N/M |

: The bleach concentration is the weight percent of OXYLITE ® type XX bleaching powder in the mixture (combination of OXYLITE ® type XX bleaching powder and diafiltration retentate) located in the reactor tank Comparison of the L*, a*, and b* values obtained in Examples 3–22 versus those obtained for Example 2 readily illustrate that the bleached diafiltration retentates 52 of Examples 3–22 have reduced color, as compared to the non-bleached diafiltration retentate 42 of Example 2. First, the L* values ranging from 73.80 to 78.42 for Examples 3–22 indicate that the bleached diafiltration retentates 52 of Examples 3–22 are significantly and desirably lighter than the non-bleached diafiltration retentate 42 of Example 2 that had the L* value of 65.58. Next, the a* values ranging from 0.66 to 2.68 for Examples 3–22 indicate that the bleached diafiltration retentates 52 of Examples 3–22 are significantly and desirably less red than the non-bleached diafiltration retentate 42 of Example 2 that had the a* value of 11.86. Finally, the b* values ranging from 17.64 to 23.93 for Examples 7–22 indicate that the bleached diafiltration retentates 52 of Examples 7–22 are significantly and desirably less yellow than the non-bleached diafiltration retentate 42 of Example 2 that had the b* value of 33.21. The b* values for Examples 3–7 indicate that the bleached diafiltration retentates 52 of Examples 3–7 exhibit approximately the same amount of yellow as the non-bleached diafiltration retentate 42 of Example 2, since Examples 2–7 each had b* values of about 33.21. Nonetheless, the bleached diafiltration retentates 52 of Examples 3–7, as explained above, each exhibit desirable and significant improvements in the L* and a* values, as compared to the L* and a* values for the non-bleached diafiltration retentate 42 of Example 2.

Examples 23–24

Examples 23 and 24 demonstrate the differences in L*, a*, and b* values from the CIELAB color space that were determined, after centrifugal separation, ultrafiltration, and diafiltration, for a sample of cheddar cheese whey that did not include any annatto extract and for a sample of cheese whey that did include annatto extract. The processing steps of Example 23 pertaining to the cheese whey that excluded annatto extract were conducted at a commercial cheese processing plant, while the processing steps of Example 24 pertaining to cheese whey that included annatto extract were conducted in a pilot plant. However, the cheese whey processed in Example 24 was obtained from the same processing plant where the details of Example 23 were obtained.

Example 23

Cheese whey that did not include any annatto extract and that was derived from the manufacture of cheese was first passed through a whey cream separator to remove some fat and suspended solids from the whey. The reduced fat whey was then ultrafiltered and diafiltered to produce a whey protein concentrate containing about 80% total protein, by weight, on a dry basis. The reduced fat whey was processed in an ultrafiltration unit that included an ABCOR spiral wound membrane with a molecular weight cut-off of about 3,000 that is available from Koch Membrane Systems of Wilmington, Mass.

The reduced fat whey was processed in the ultrafiltration unit without any addition of dilution water. The flow rate of the ultrafiltration retentate was set, relative to the ultrafiltration permeate flow rate, to attain a total solids content in the ultrafiltration retentate of about 30 weight percent, on the Brix scale, by controlling the back pressure on the ultrafiltration retentate discharge. During this phase of ultrafiltration, an inlet pressure of about 80 psig was maintained on the feed to the ultrafiltration unit and the discharge pressure on the ultrafiltration retentate was measured to be about 20 psig. The temperature of the feed in the ultrafiltration unit was maintained in the range of between about 55° F. and about 120° F. during this ultrafiltration step.

After this initial ultrafiltration, the ultrafiltration retentate was diafiltered in the ultrafiltration unit by continuously adding dilution water to the diafiltration feed (ultrafiltration retentate) until the total solids concentration of the diafiltration permeate dropped to about 0.6% (about 0.6 Brix). The diafiltration retentate that was obtained by diafiltering the ultrafiltration retentate in the ultrafiltration unit was then spray dried to a moisture content of less than about 5 weight percent. The spray dried diafiltration retentate was then analyzed for the L*, a*, and b* values in the CIELAB color space. The upper, lower, and mean L*, a*, and b* values obtained over an extended period of time for different spray dried diafiltration retentate produced in accordance with this Example are presented in Table IV below:

TABLE IV

|  | L* | a* | b* |
|---|---|---|---|
| Upper Limit | 96.2 | −0.7 | 13.9 |
| Mean | 92.4 | −1.1 | 11.2 |
| Lower Limit | 88.6 | −1.5 | 8.6 |

Example 24

Twenty one samples of the spray dried diafiltration retentate produced in Example 23 were reconstituted in this example. Each of the spray dried diafiltration retentates was based on cheese whey not including any annatto extract. Each of the reconstituted samples were prepared by combining 10 grams of the particular spray dried diafiltration retentate with 90 grams of reverse osmosis water. Each reconstituted sample was stirred until the spray dried diafiltration retentate was fully dissolved. The reconstituted samples were allowed to sit for about one hour to permit evolution of any bubbles present.

The reconstituted samples of spray dried diafiltration retentate were then analyzed for the L*, a*, and b* values in the CIELAB color space using the Hunter LabScan II Colorimeter in accordance with the reflectance spectra determination details provided in the Property Characterization Section above for liquid samples. The upper, lower, and mean L*, a*, and b* values obtained for the different reconstituted samples of spray dried diafiltration retentate produced in accordance with this Example are presented in Table V below:

TABLE V

|  | L* | a* | b* |
|---|---|---|---|
| Upper Limit | 76.6 | −0.9 | 16.5 |
| Mean | 71.6 | −1.7 | 13.7 |
| Lower Limit | 66.5 | −2.5 | 11.0 |

Example 25

The details of this Example are similar to the details included in Example 23, with the exception that the details in Example 25 were determined in a pilot plant that recreated the process conditions experienced in Example 23 and with the further exception that the whey material used as feed to the ultrafiltration unit in this Example was colored with annatto extract.

A diafiltration retentate was obtained by processing the cheese whey containing annatto extract in accordance with the details provided in Example 23. The diafiltration retentate was then spray dried to a moisture content of less than about 5 weight percent. The spray dried diafiltration retentate was analyzed for the L*, a*, and b* values in the CIELAB color space. The values determined for this diafiltration retentate derived from the whey material that included annatto extract are: L*=82.71; a*=2.53, and b*=23.74.

Comparison of the L*, a*, and b* values obtained in Example 25 versus those provided in Example 23 readily illustrate that the spray dried diafiltration retentate based on the colored whey material feed of Example 25 were outside the range of upper and lower limits observed for the spray dried diafiltration retentate obtained in Example 23 based on the non-colored whey material feed. First, the L* value of 82.71 indicates that the spray dried diafiltration retentate obtained in Example 25 based on the colored whey material feed is significantly and undesirably darker than the L* range of 88.6 to 96.2 that was determined for the spray dried diafiltration retentate obtained in Example 23 based on the non-colored whey material feed. Next, the a* value of 2.53 indicates that the spray dried diafiltration retentate obtained in Example 25 based on the colored whey material feed is significantly and undesirably redder than the a* range of −0.7 to −1.5 that was determined for the spray dried diafiltration retentate obtained in Example 23 based on the non-colored whey material feed. Finally, the b* value of 23.74 indicates that the spray dried diafiltration retentate obtained in Example 25 based on the colored whey material feed is significantly and undesirably yellower than the b* range of 8.6 to 13.9 that was determined for the spray dried diafiltration retentate obtained in Example 23 based on the non-colored whey material feed.

Example 26

A sample of the spray dried diafiltration retentate produced in Example 25 was reconstituted in this example. The spray dried diafiltration retentate was based on cheese whey that included annatto extract. The reconstituted sample was prepared by combining 10 grams of the spray dried diafiltration retentate produced in Example 25 with 90 grams of reverse osmosis water. The reconstituted sample was stirred until the spray dried diafiltration retentate was fully dissolved. The reconstituted sample was then allowed to sit for about one hour to permit evolution of any bubbles present.

The reconstituted sample of spray dried diafiltration retentate was then analyzed for the L*, a*, and b* values in the CIELAB color space using the Hunter LabScan II Colorimeter in accordance with the reflectance spectra determination details provided in the Property Characterization Section above for liquid samples. The values determined for this reconstituted sample of spray dried diafiltration retentate that was based on the whey material that included annatto extract were: L*=66.38; a*=6.40, and b*=28.74.

Examples 27–28

Examples 27 and 28 provide details and observations about application of the exact same process to a whey material feed that is colorized with annatto extract (Example 28) versus a whey material feed that is not colored with annatto extract (Example 27). Other than containing annatto extract, the whey material feed used in Example 28 is very similar to the whey material feed used in Example 27, since the whey material feeds were obtained from the same cheese processing plant.

Example 27—Part A

Cheddar cheese whey derived from the manufacture of cheddar cheese was ultrafiltered to form a whey protein concentrate (ultrafiltration retentate) containing approximately 35% total protein by weight on a dry basis. The cheddar cheese whey used in this Example did not include annatto extract. The ultrafiltration unit contained an ABCOR spiral wound membrane with a molecular weight cut-off of about 3,000 that is available from Koch Membrane Systems of Wilmington, Mass.

The cheese whey was processed in the ultrafiltration unit without any addition of dilution water. The flow rate of the ultrafiltration retentate was set, relative to the ultrafiltration permeate flow rate, to achieve a total solids concentration in the ultrafiltration retentate of between about 10 weight percent and about 11 weight percent, on the Brix scale, by controlling the back pressure on the ultrafiltration retentate discharge. During this phase of ultrafiltration, an inlet pressure of about 80 psig was maintained on the cheddar cheese whey feed to the ultrafiltration unit and the discharge pressure on the ultrafiltration retentate was measured to be about 20 psig. The temperature of the cheddar cheese whey feed to the ultrafiltration unit was maintained in the range of between about 55° F. and about 120° F. during this ultrafiltration step.

The whey protein concentrate (ultrafiltration retentate) was then pasteurized at about 163° F. for 15 seconds. After pasteurization was complete, the whey protein concentrate was cooled to about 120° F. and sent through a whey cream separator to remove some fat and some suspended solids and thereby form reduced fat whey protein concentrate. The whey protein concentrate (ultrafiltration retentate) was fed into the whey cream separator at a very slow rate to maximize the residence time of the whey protein concentrate in the cream separator. As expected, only a small amount of fat and suspended solids were removed in the cream separator because of the relatively small size of the fat particles and the presence of phospholipids which tends to maintain the fats in suspension despite the gravitational forces applied in the cream separator. The reduced fat whey protein concentrate derived from the cream separator was then cooled to about 40° F. and placed in storage.

Example 27—Part B

This part of Example 27 illustrates the microfiltration aspect of the present invention. The microfiltration (Part B of this Example) aspect of this Example was conducted in accordance with the schematic drawing of FIG. 1. Therefore, the terminology used in Part B of this Example mirrors the terminology used with reference to FIG. 1. The reduced fat whey protein concentrate obtained in Part A of this Example was microfiltered in continuous mode, without any addition of dilution water, in the microfilter 30. Additionally, no diafiltration was conducted on the microfiltration retentate 32.

The microfilter 30 consisted of an AF-series microfiltration membrane structure obtained from PTI Advanced Filtration, Inc. of San Diego, Calif. that was positioned in a microfiltration cannister. The membrane of the microfiltration membrane structure was manufactured of polyvinyl diflouride (PVDF) with a molecular weight cut-off (MWCO) of about 1,000,000 daltons and a nominal pore diameter in the range of about 0.05 microns to about 0.2 microns. The AF series membrane structure about 17 to 18 spirals of the membrane fabric. The distance between facing spirals of the fabric was about 65 mils.

The flow rate of the microfiltration retentate 32 (MF retentate) was set, relative to the microfiltration permeate 33 (MF permeate) flow rate, to attain a total solids content in the microfiltration retentate 32 (MF retentate) of about 25 weight percent, on the Brix scale, by controlling the back pressure on the microfiltration retentate 32 (MF retentate). The microfilter 30 was operated to maintain an inlet pressure of less than about 18 psig to the membrane structure and the back pressure on the microfiltration retentate 32 was determined to be about 3 psig. The temperature of the reduced fat whey protein concentrate feed entering the microfilter 30 was maintained between about 40° F. and about 140° F. The microfiltration permeate 33 derived from the microfilter 30 was collected and used as the feed to the ultrafiltration unit 54 in Part C of this Example, which follows.

Example 27—Part C

This portion of Example 27 demonstrates the ultrafiltration and subsequent diafiltration of the microfiltration permeate 33 (MF permeate) obtained in Part B of this Example. The ultrafiltration and diafiltration aspects of this Example (Part C) were conducted in accordance with the schematic drawing of FIG. 1. Therefore, the terminology used in Part C of this Example mirrors the terminology used with reference to FIG. 1. The microfiltration permeate 33 obtained in Part B of this Example was ultrafiltered in continuous mode, without any addition of dilution water, in the ultrafiltration unit 54.

The ultrafiltration unit 54 contained an ABCOR spiral wound membrane with a molecular weight cut-off of about 3,000 that is available from Koch Membrane Systems of Wilmington, Mass. The microfiltration permeate 33 was processed in the ultrafilter 54 without any addition of dilution water to form the ultrafiltration retentate 56 and ultrafiltration permeate 58.

The flow rate of the ultrafiltration retentate 56 was set, relative to the ultrafiltration permeate 58 flow rate, to attain a total solids content in the ultrafiltration retentate 56 of about 30 weight percent, on the Brix scale, by controlling the back pressure on the ultrafiltration retentate 56 discharge. During this phase of ultrafiltration, an inlet pressure of about 80 psig was maintained on the microfiltration permeate 33 feed to the ultrafiltration unit 54 and the discharge pressure on the ultrafiltration retentate 56 was measured to be about 20 psig. The temperature of the microfiltration permeate 33 feed in the ultrafiltration unit 54 was maintained in the range of between about 55° F. and about 120° F. during this ultrafiltration step.

After this initial ultrafiltration step, the ultrafiltration retentate 56 was diafiltered in the ultrafiltration unit 54 to form the diafiltration retentate 60 and the diafiltration permeate 62 by continuously adding dilution water to the ultrafiltration retentate 56 feed until the total solids concentration of the diafiltration permeate 62 dropped to about 0.6% (about 0.6° Brix). The diafiltration permeate 62 (DF/UF 2(b) permeate) that was obtained by diafiltering the ultrafiltration retentate 56 in the ultrafiltration unit 54 was then spray dried to a moisture content of less than about 5 weight percent.

Various parameters of the spray dried DF/UF 2(b) retentate were analyzed in accordance with the test methods described above in the property characterization section of this document. These parameters for the spray dried DF/UF 2(b) retentate of this Example that are based upon the whey material feed that excluded annatto extract are provided in Tables VI and VII that follow Example 28.

Example 28

In Example 28, the same process steps were utilized as detailed in Example 27 to produce spray dried DF/UF 2(b) retentate. The only difference between Example 28 and Example 27 is that the cheese whey used as feed in Example 28 was colored with annatto extract. Various parameters of the spray dried DF/UF 2(b) retentate produced in Example 28, corresponding to the spray dried DF/UF 2(b) retentate produced in Example 27, were analyzed in accordance with the test methods described above in the property characterization section of this document. These parameters for the spray dried DF/UF 2(b) retentate of Example 28, as well as these parameters for the spray dried DF/UF 2(b) retentate of Example 27, are provided in Tables VI and VII, which follow:

TABLE VI

|  | Spray Dried DF/UF 2(b) Retentate of Example 27 | Spray Dried DF/UF 2(b) Retentate of Example 28 |
| --- | --- | --- |
| Wt % Moisture (wet basis) | 4.59 | 4.70 |
| Wt % Total Protein (wet basis) | 89.95 | 90.75 |
| Wt % Fat (wet basis) | 0.02 | 0.19 |
| Wt % Lactose (wet basis) | 0.6 | 0.2 |
| Wt % NPN (wet basis) | 4.66 | 4.35 |
| WPN (mg/g) (wet basis) | 125.46 | 133.50 |
| Wt % Casein (wet basis) | <0.01 | <0.01 |

TABLE VII

| | Spray Dried DF/UF 2(b) Retentate of Example 27 | Spray Dried DF/UF 2(b) Retentate of Example 28 |
|---|---|---|
| L* | 94.6 | 94.1 |
| a* | −0.77 | −0.68 |
| b* | 5.8 | 10.0 |

OTHER OBSERVATIONS BASED ON EXAMPLES 27 AND 28

Besides the parameters that are presented in Tables VI and VII above from Examples 27 and 28, Examples 27 and 28 also yielded the observation that some annatto extract from the cheddar cheese whey containing annatto extract does pass through the microfiltration membrane of the microfilter 30 as part of the microfiltration permeate 33, though the majority of the annatto extract does stay with the microfiltration retentate 32. The visible transmission spectra of the microfiltration permeate 33, the ultrafiltration retentate 56 and the diafiltration retentate 60 that were based on the non-colored cheddar cheese whey in Example 27, and that were based on the colored cheddar cheese whey containing annatto extract in Example 28, were evaluated using the Beckman DU-50 spectrophotometer in accordance with the technique described above in the property characterization section of this document. Graphs of the visible transmission spectra for these various streams are presented in FIGS. 9–14.

Figure 9:
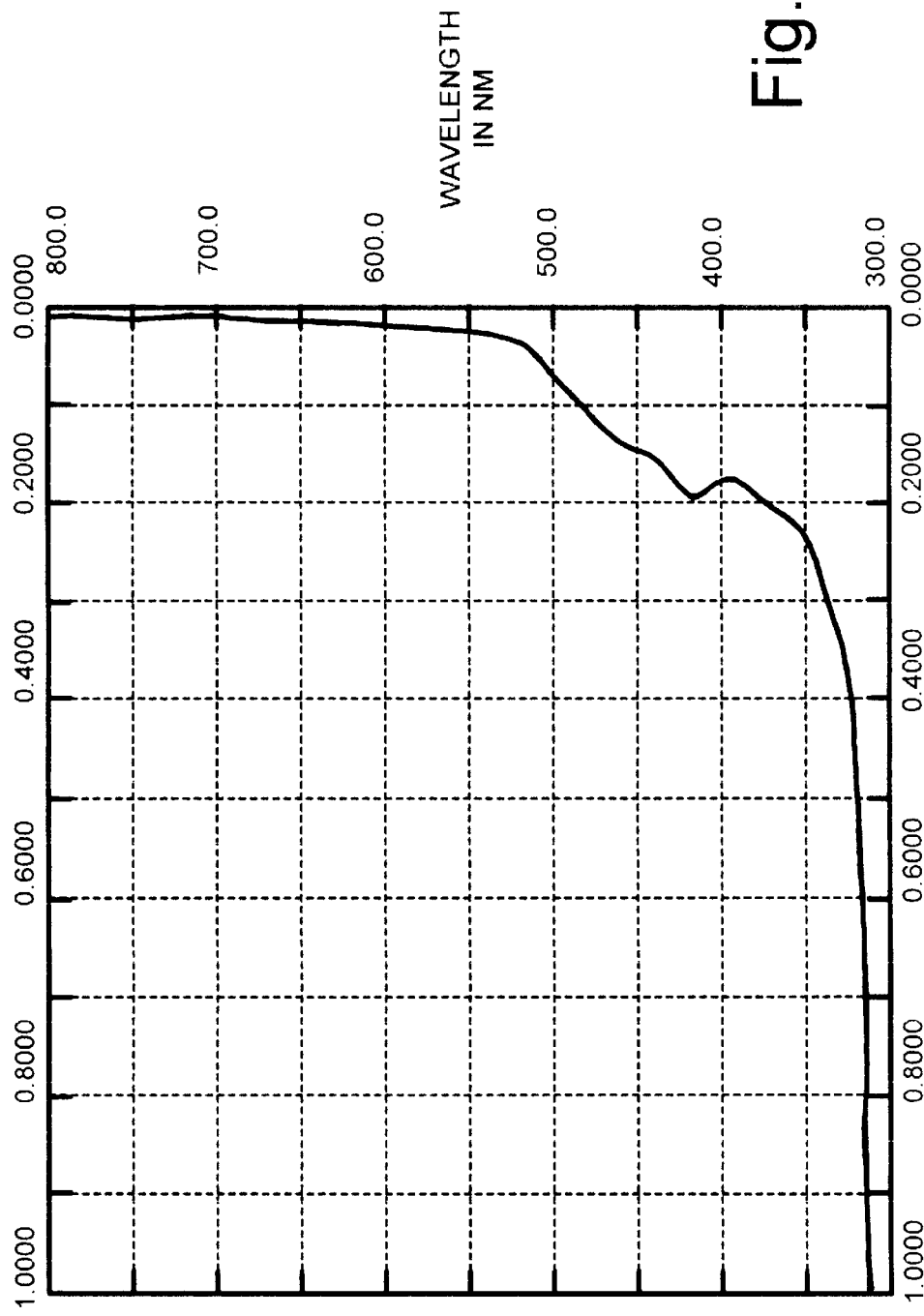
FIG. 9 is a graph of absorbance versus wavelength for a microfiltration permeate derived from a whey material that contains annatto extract.
Figure 10:
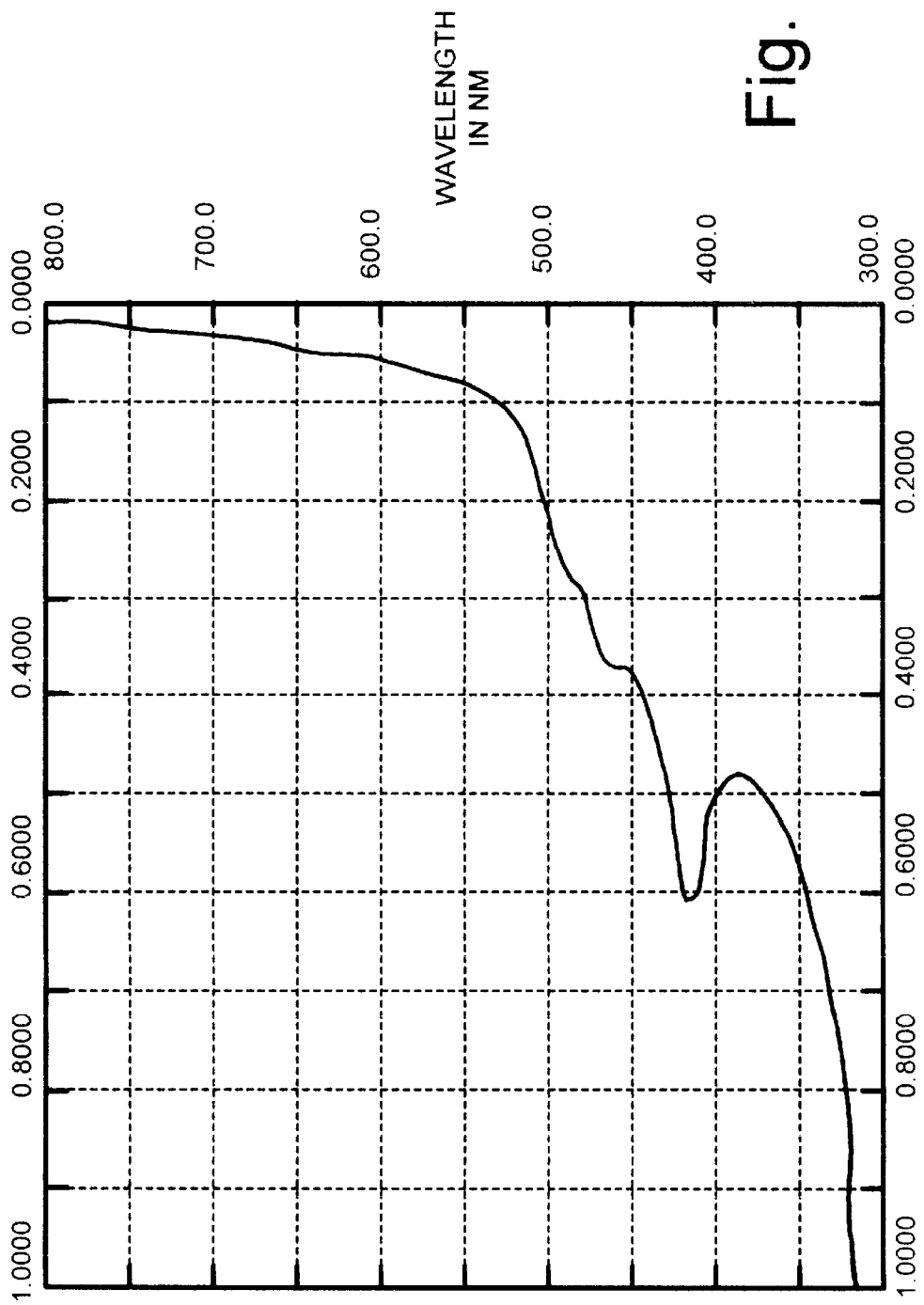
FIG. 10 is a graph of absorbance versus wavelength for an ultrafiltration retentate derived from the microfiltration permeate that is the subject of the graph in FIG. 9.

As depicted in FIG. 9, the microfiltration permeate 33 of Example 28 that was based on the annatto extract-colored cheese whey has a spectral shoulder at about 460 nanometers. Referencing FIG. 12, the shoulder at 460 nanometers does not appear in the microfiltration permeate 33 of Example 27 that is based upon the cheddar cheese whey not containing annatto extract. Referring back to FIG. 10, this 460 nanometer shoulder persists and even increases in the ultrafiltration retentate 56 of Example 28. This indicates that the coloring agent, namely annatto extract, is concentrated in the ultrafiltration retentate 56. Of course, referencing FIG. 13, the shoulder at 460 nanometers continues to be absent in the ultrafiltration retentate 56 of Example 27 that is based upon the cheddar cheese whey not containing annatto extract.

Figure 11:
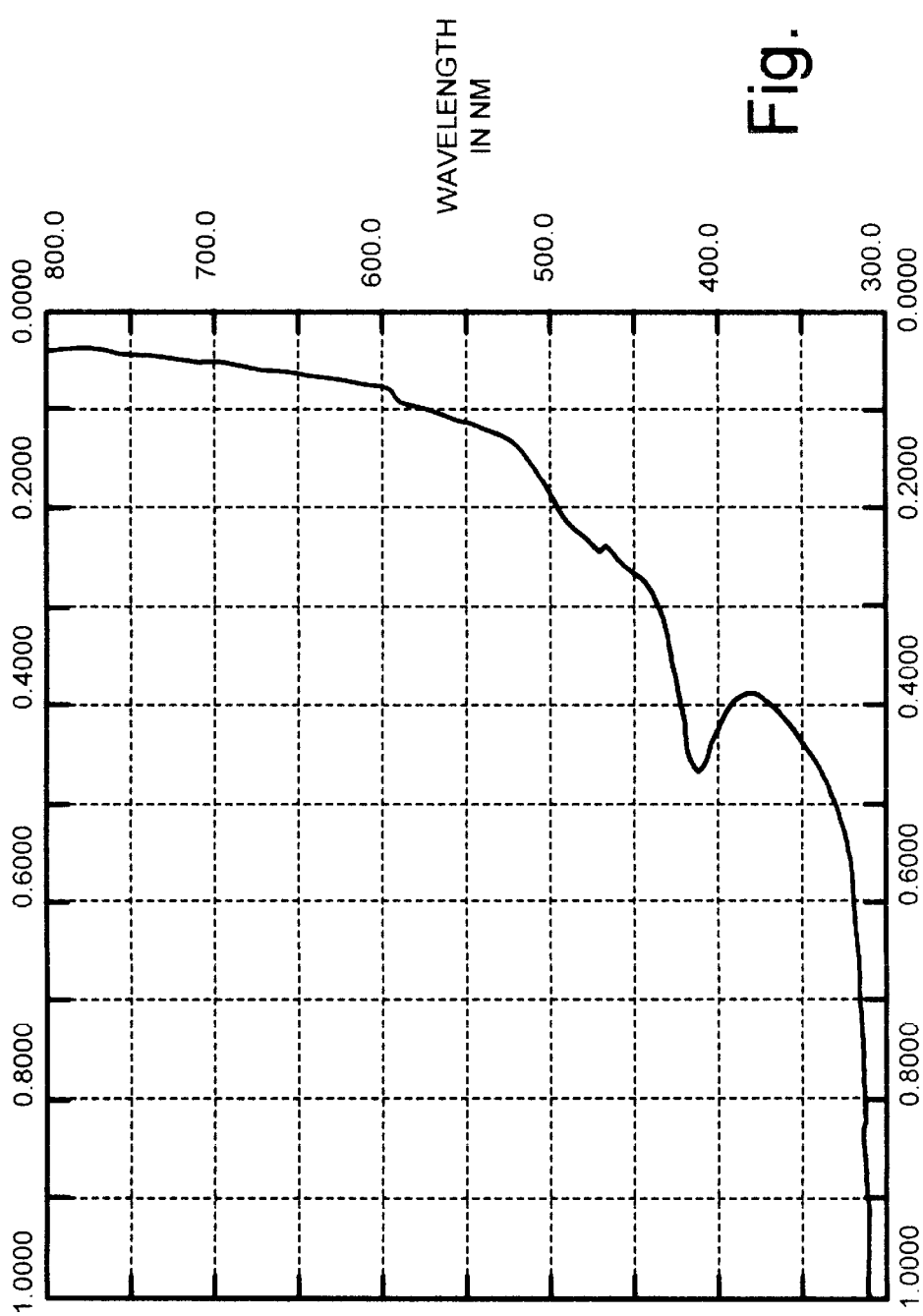
FIG. 11 is a graph of absorbance versus wavelength for a diafiltration retentate derived from the ultrafiltration retentate that is the subject of the graph of FIG. 10.
Figure 12:
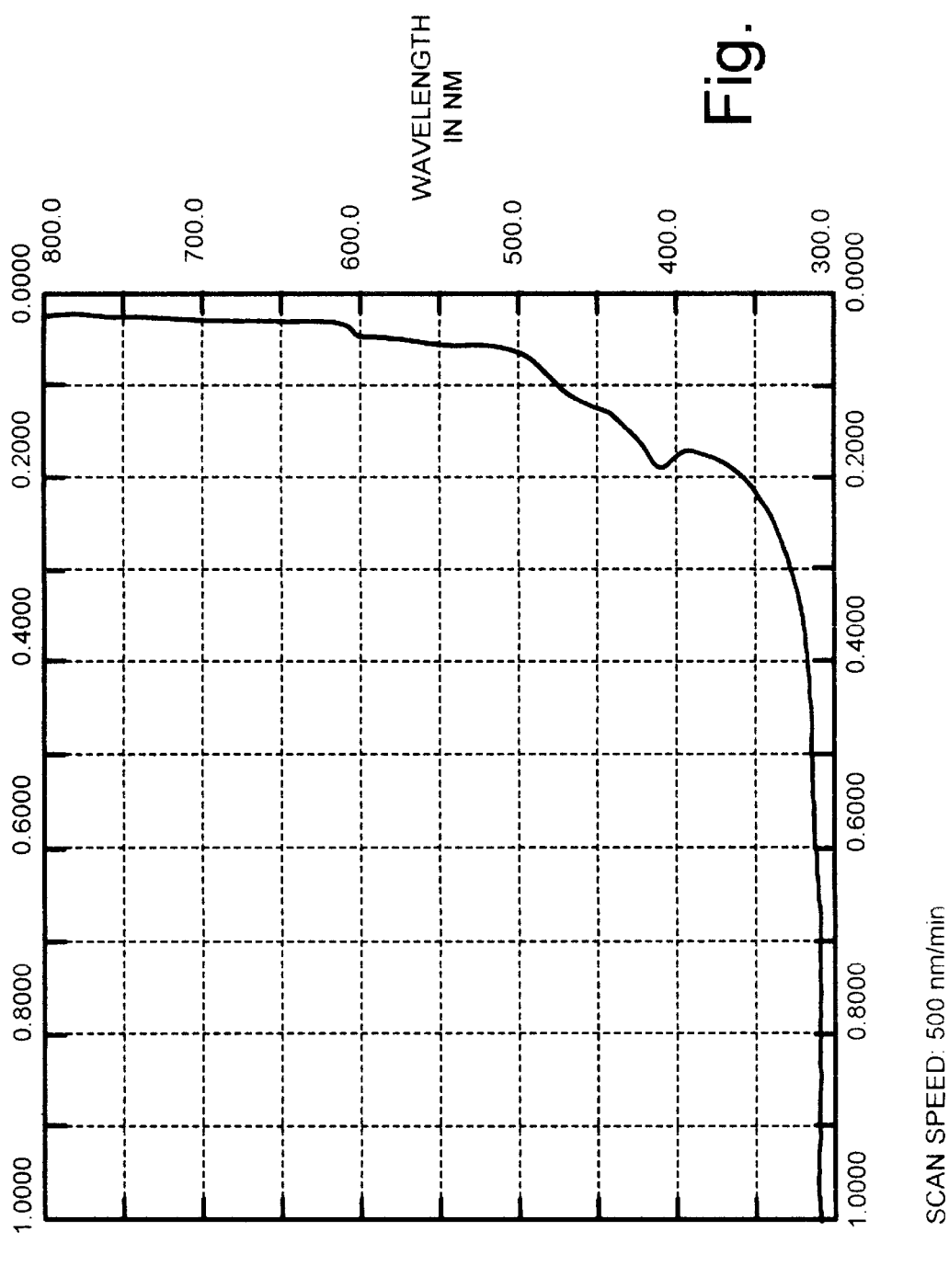
FIG. 12 is a graph of absorbance versus wavelength for a microfiltration permeate derived from a whey material that does not contain annatto extract.
Figure 13:
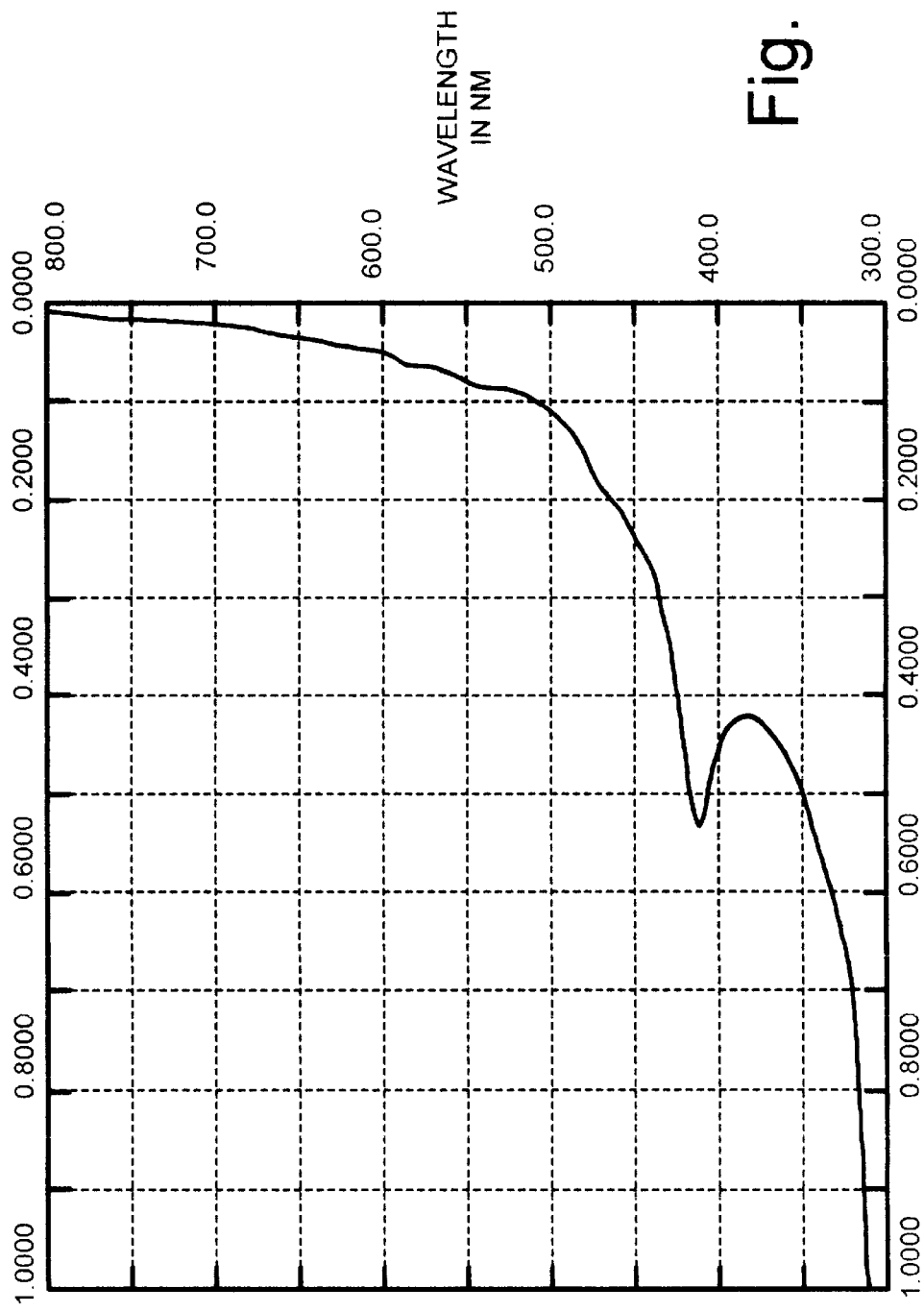
FIG. 13 is a graph of absorbance versus wavelength for an ultrafiltration retentate derived from the microfiltration permeate that is the subject of the graph in FIG. 12.
Figure 14:
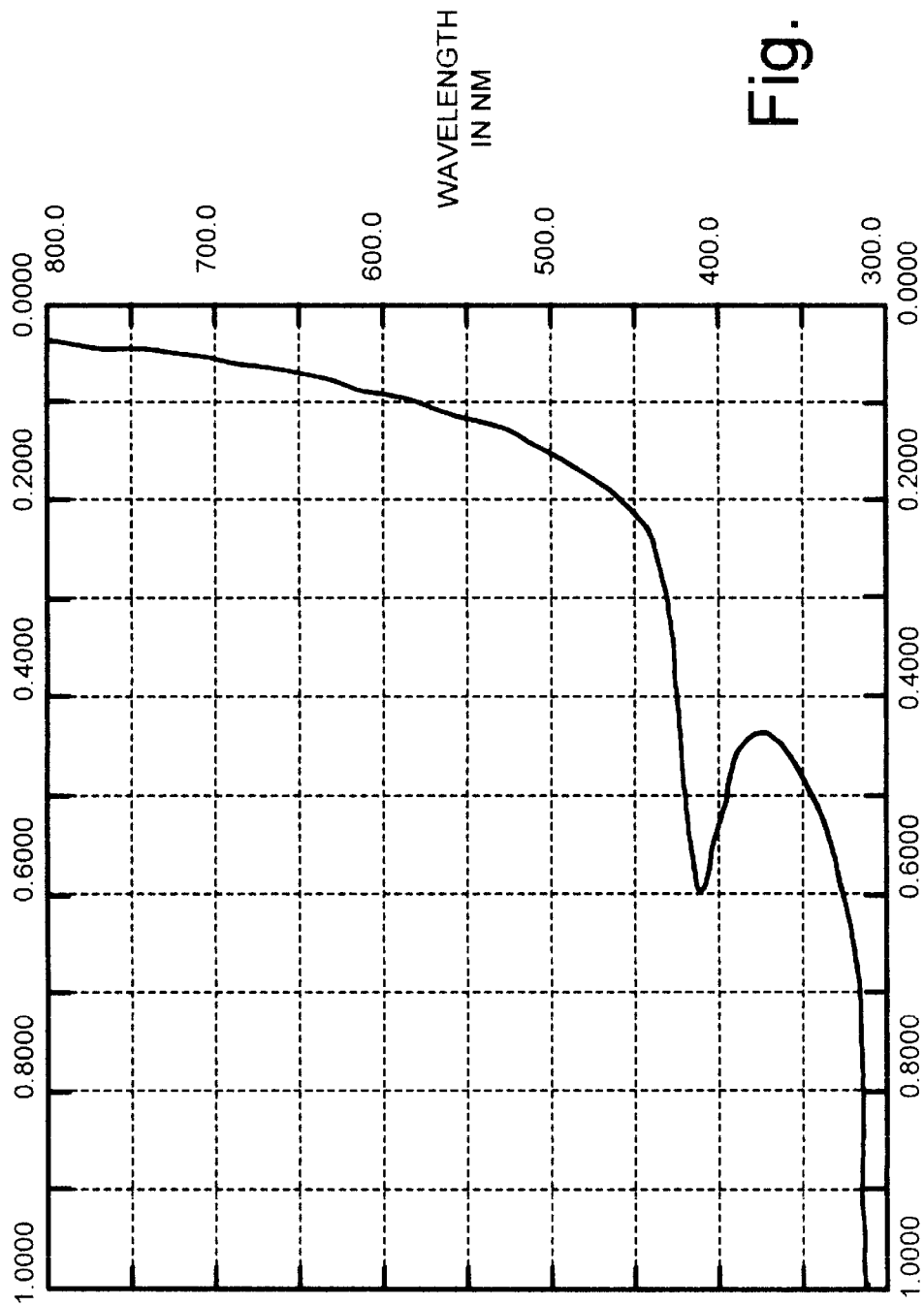
FIG. 14 is a graph of absorbance versus wavelength for a diafiltration retentate derived from the ultrafiltration retentate that is the subject of the graph of FIG. 13.

Referring next to FIG. 11, it is evident that this shoulder at approximately 460 nanometers is predominantly reduced in the diafiltration retentate 60 based on the cheddar cheese whey of Example 28 that contains annatto extract. As expected, referencing FIG. 14, the shoulder at 460 nanometers continues to be absent in the diafiltration retentate 60 of Example 27 that is based upon the cheddar cheese whey not containing annatto extract.

The foregoing observation with respect to FIG. 11 indicates that, even though the annatto extract is initially concentrated by ultrafiltration, the annatto extract is sufficiently transmissible so that diafiltration substantially washes the annatto extract into the diafiltration permeate 62, leaving the diafiltration retentate 60 with only a small percentage of the annatto extract that originally entered the ultrafilter as a component of the microfiltration permeate 33 feed to the ultrafilter. This demonstrates why it is preferred, following microfiltration, to ultrafilter the microfiltration permeate 33 and then to subsequently diafilter the ultrafiltration retentate 56 so that the native and soluble protein rich stream [diafiltration retentate 60 stream from the ultrafilter UF 2(b)] retains only a minimal amount, if any, of the annatto extract contained in the feed to the ultrafilter 2(b). Thus, this ultrafiltration/diafiltration step further helps to minimize the amount of annatto extract in the reduced color whey product. The foregoing observation with respect to FIG. 11 also demonstrates why the process 410 of FIG. 6 is preferred, since the ultrafilter 72 removes all, or essentially all, of any water-soluble coloring agent that exists in the microfiltration permeate 33 component (or optionally in the diafiltration permeate component 35) of the reduced color whey product 66.

Example 29

The microfiltration (see Part B of this Example), bleaching (See Part C of this Example), and subsequent ultrafiltration and diafiltration (see Part D of this Example) aspects of this Example were conducted in accordance with the schematic drawing of FIG. 6. Therefore, the terminology used in Example 29 mirrors the terminology used with reference to FIG. 6.

Example 29—Part A

Cheddar cheese whey derived from the manufacture of cheddar cheese was ultrafiltered to form a whey protein concentrate (ultrafiltration retentate 22) containing approximately 35% total protein by weight on a dry basis. Both the cheddar cheese whey and the whey protein concentrate contained annatto extract and were orange in color. The whey protein concentrate was immediately cooled to about 40° F. after production and prior to microfiltration in accordance with Part B below. The pH of the whey protein concentrate was between about 6.2 and 6.4 standard pH units which indicates that good handling procedures were observed.

Example 29—Part B

This part of Example 29 illustrates the microfiltration aspect of the present invention. The whey protein concentrate obtained in Part A of Example 29 was microfiltered in continuous mode in microfilter 30 without any addition of dilution water to produce microfiltration retentate 32 and microfiltration permeate 33. No diafiltration was conducted on the microfiltration retentate 32, which was orange in color and contained annatto extract.

The microfilter 30 consisted of an AF-series microfiltration membrane structure obtained from PTI Advanced Filtration, Inc. of San Diego, Calif. that was positioned in a microfiltration cannister. The membrane of the microfiltration membrane structure was manufactured of polyvinyl diflouride (PVDF) with a molecular weight cut-off (MWCO) of about 1,000,000 daltons and a nominal pore diameter in the range of about 0.05 microns to about 0.2 microns. The AF-series membrane structure included about 17 to 18 spirals of the membrane fabric. The distance between facing spirals of the fabric was about 65 mils.

The flow rate of the microfiltration retentate 32 (MF retentate) was set, relative to the microfiltration permeate 33 (MF permeate) flow rate, to attain a total solids content in the microfiltration retentate 32 (MF retentate) of about 25 weight percent, on the Brix scale, by controlling the back pressure on the microfiltration retentate 32 (MF retentate). The microfilter 30 was operated to maintain an inlet pressure of less than about 18 psig to the membrane structure and the back pressure on the microfiltration retentate 32 was determined to be about 3 psig. The temperature of the reduced fat whey protein concentrate feed entering the microfilter 30 was maintained between about 40° F. and about 140° F. The microfiltration retentate 32 derived from the microfilter 30 was collected and bleached in Part C of this Example, which follows.

Example 29—Part C

This step of Example 29 demonstrates the bleaching of the microfiltration retentate 32 to oxidize the annatto extract contained in the microfiltration retentate 32. First, the bleach 46 was formed as an aqueous solution by combining OXY-LITE® type XX bleaching powder and water in the ratio of fifty (50) pounds of OXYLITE® type XX bleaching powder per eighty (80) gallons of water. The microfiltration retentate 32 from Part B of this Example was warmed to about 140° F. and continuously blended with the aqueous solution of OXYLITE® type XX bleaching powder at the rate of about 0.15 gallons of aqueous bleach solution per gallon of microfiltration retentate 32 and fed to the reactor tank 50. The ratio of benzoyl peroxide (the active bleaching agent in OXY-LITE® type XX bleaching powder) to annatto extract added to the milk feed during the cheese manufacturing process was calculated to be about 1.1 ounces (weight basis) of ultrafiltration retentate 74 was measured to be about 20 psig. The temperature of the reduced color whey product 66 feed in the ultrafiltration unit 72 was maintained in the range of between about 55° F. and about 120° F. during this ultrafiltration step.

After this initial ultrafiltration step, the ultrafiltration retentate 74 was diafiltered in the ultrafiltration unit 36 to form the diafiltration retentate 78 and diafiltration permeate 80 by continuously adding dilution water to the ultrafiltration retentate 74 feed until the total solids concentration of the diafiltration permeate 80 dropped to about 0.6% (about 0.6° Brix). The diafiltration retentate 78 was then fed to the spray dryer 68 to form the dried reduced color whey product 70.

Eight samples (Samples A–H) of the dried reduced color whey product obtained above were taken over a period of several days. The $L^*$, $a^*$, and $b^*$ values from the CIELAB color space were determined in accordance with the technique described above in the property characterization section of this document for these eight samples that are presented in Table VIII below:

TABLE VII

|  | Sample A | Sample B | Sample C | Sample D | Sample E | Sample F | Sample G | Sample H |
|---|---|---|---|---|---|---|---|---|
| $L^*$ | 89.10 | 88.78 | 88.74 | 89.96 | 92.35 | 92.44 | 89.92 | 90.51 |
| $a^*$ | −1.24 | −1.50 | −0.96 | −1.29 | −1.38 | −1.39 | −0.99 | −0.99 |
| $b^*$ | 13.44 | 13.50 | 14.54 | 15.12 | 12.49 | 12.40 | 13.31 | 12.62 | benzoyl peroxide per ounce (weight basis) of annatto extract in the milk feed. The mixture of aqueous bleach solution and microfiltration retentate 32 was held in the reactor tank 50 for about 8 minutes at a temperature of about 140° F. During the bleaching step, the agitator 88 operated between about 12 revolutions per minute and 15 revolutions per minute to optimize the bleaching reaction within the tank 82. After the 8 minute bleaching period in the tank 50 was completed, the bleached retentate 52 was transferred to the blend tank 64 for combining with the microfiltration permeate 33 obtained in Part B of this Example.

Example 29—Part D

This portion of Example 29 demonstrates the ultrafiltration and subsequent diafiltration of the reduced color whey product 66 derived from blending the bleached retentate 52 from Part C of this Example with the microfiltration permeate 33 obtained in Part B of this Example in the blend tank 64. The ultrafiltration unit 72, which was operated in continuous mode, employed an ABCOR spiral wound membrane with a molecular weight cut-off of about 3,000 that is available from Koch Membrane Systems of Wilmington, Mass. The reduced color whey product 66 was processed in the ultrafiltration unit 72 without any addition of dilution water to form the ultrafiltration retentate 74 and ultrafiltration permeate 76.

The flow rate of the ultrafiltration retentate 74 was set, relative to the ultrafiltration permeate 76 flow rate, to attain a total solids content in the ultrafiltration retentate 74 of about 30 weight percent, on the Brix scale, by controlling the back pressure on the ultrafiltration retentate 74. During this phase of ultrafiltration, an inlet pressure of about 80 psig was maintained on the reduced color whey product 66 feed to the ultrafiltration unit 74 and the discharge pressure on the Comparison of the $L^*$, $a^*$, and $b^*$ values obtained for Samples A–H reveals that these $L^*$, $a^*$, and $b^*$ values obtained for Samples A–H fall within the most preferred ranges for the $L^*$, $a^*$, and $b^*$ values for dried samples: $L^*$ (about +84 to about +100); $a^*$ (about 0 to about −2); and $b^*$ (about +16 to about +6). Comparison of the $L^*$ and $a^*$ values obtained for Samples A–H with the $L^*$ and $a^*$ values obtained in Example 23 for the spray dried diafiltration retentate that was based on cheese whey not including any annatto extract reveals that these $L^*$ and $a^*$ values obtained for Samples A–H desirably fall squarely between the upper and lower limits (See Table IV above) of the $L^*$ and $a^*$ values obtained over an extended period of time for spray dried diafiltration retentate produced in accordance with Example 23 that was based on cheese whey not including any annatto extract. Comparison of the $b^*$ values obtained for Samples A–B and E–H with the $b^*$ values obtained in Example 23 for the spray dried diafiltration retentate that was based on cheese whey not including any annatto extract reveals that these $b^*$ values obtained for Samples A–B and E–H also desirably fall squarely between the upper and lower limits (See Table IV above) of the $b^*$ values obtained over an extended period of time for spray dried diafiltration retentate produced in accordance with Example 23 that was based on cheese whey not including any annatto extract. Though the $b^*$ values obtained for Samples C and D fall slightly outside the range of $b^*$ values obtained in Example 23 for the spray dried diafiltration retentate that was based on cheese whey not including any annatto extract, these $b^*$ values still fall well within the most preferred range for the $b^*$ values for dried samples: (about +16 to about +6).

Additionally, the color of the dried reduced color whey product 70 that was produced in Example 29 and that was based on cheddar cheese whey containing annatto extract was compared to a dried whey product based on cheddar cheese whey not containing annatto extract which was processed similarly to the annatto extract-containing whey, with the exceptions that the microfilter 30 was not used and no bleaching occurred. The processing conditions for the cheddar cheese whey containing annatto extract and cheddar cheese whey not containing annatto extract were the same other than for the exclusion of the microfiltration and bleaching steps for the dried whey product based on the cheddar cheese whey not containing annatto extract. It was visually observed that the color of the dried reduced color whey product based on cheddar cheese whey containing annatto extract was very similar to the color of the dried whey product based on cheddar cheese whey not containing annatto extract.

Although the present invention has been described with reference to preferred embodiments, workers skilled in the art will recognize that changes may be made in form and detail without departing from the spirit and scope of the invention.

What is claimed is:

1. A method of producing a reduced color dairy product, the method comprising the steps of:

separating a dairy material comprising native and soluble protein and a coloring agent into a first portion and a second portion, the first portion comprising an amount of the native and soluble protein, as determined by high pressure liquid chromatography at a detection wavelength of 280 nanometers, from the dairy material and the second portion comprising at least about 50 weight percent of the coloring agent from the dairy material; and partially or fully deactivating at least some of the coloring agent in the second portion to form a reduced color portion, the reduced color dairy product comprising at least some of the reduced color portion.

2. The method according to claim 1 wherein the steps of partially or fully deactivating at least some of the coloring agent comprises the steps of:

blending a bleaching agent with at least some of the coloring agent, the bleaching agent capable of at least partially oxidizing the coloring agent.

3. The method according to claim 2 wherein the bleaching agent comprises benzoyl peroxide, hydrogen peroxide, ozone or any combination of any of these.

4. The method according to claim 1 wherein the first portion contains at least about 30% by weight, as determined by high pressure liquid chromatography at a detection wavelength of 280 nanometers, of the native and soluble protein from the dairy material.

5. The method according to claim 1 wherein the first portion contains at least about 60% by weight, as determined by high pressure liquid chromatography at a detection wavelength of 280 nanometers, of the native and soluble protein from the dairy material.

6. The method according to claim 1 wherein the second portion contains at least about 80 percent, by weight, of the coloring agent from the dairy material.

7. The method according to claim 1 wherein the second portion contains at least about 99 percent, by weight, of the coloring agent from the dairy material.

8. The method according to claim 1 wherein the coloring agent is an annatto extract.

9. A method of processing a dairy material, the dairy material comprising native and soluble protein and a coloring agent, the method comprising the steps of:

separating the dairy material into a first portion and a second portion, the first portion comprising an amount, as determined by high pressure liquid chromatography at a detection wavelength of 280 nanometers, of the native and soluble protein from the dairy material and the second portion comprising at least about 50 weight percent of the coloring agent from the dairy material; and processing the second portion to partially or fully deactivate at least some of the coloring agent.

10. The method according to claim 9 wherein the first portion contains at least about 30% by weight, as determined by high pressure liquid chromatography at a detection wavelength of 280 nanometers, of the native and soluble protein from the dairy material.

11. The method according to claim 9 wherein the first portion contains at least about 60% by weight, as determined by high pressure liquid chromatography at a detection wavelength of 280 nanometers, of the native and soluble protein from the dairy material.

12. The method according to claim 9 wherein the second portion contains at least about 50% by weight of the coloring agent from the dairy material.

13. The method according to claim 9 wherein the coloring agent is annatto extract.

14. The method according to claim 9 wherein the step of processing the second portion to partially or fully deactivate at least some of the coloring agent comprises the step of:

blending at least part of the coloring agent of the second portion with a bleaching agent, the bleaching agent capable of at least partially oxidizing the coloring agent.

15. The method according to claim 14 wherein the bleaching agent comprises benzoyl peroxide, hydrogen peroxide, ozone or any combination of any of these.

16. The method according to claim 9 wherein the step of processing the second portion to partially or fully deactivate at least some of the coloring agent comprises the step of:

partially or fully oxidizing at least some of the coloring agent with a bleaching agent.

17. The method according to claim 9 wherein the step of processing the second portion produces a reduced color dairy intermediate, the method further comprising the step of:

combining at least some of the first portion and at least some of the reduced color dairy intermediate to form a reduced color dairy product.

18. The method according to claim 9 wherein the step of processing the second portion produces a reduced color dairy intermediate, the method further comprising the step of:

combining at least part of the first portion and at least part of the reduced color dairy intermediate to form a first reduced color dairy product; and drying the first reduced color dairy product to form a second reduced color dairy product.

19. The method according to claim 9 wherein the step of processing the second portion produces a reduced color dairy intermediate and wherein the first portion and the reduced color dairy intermediate each comprise water, the method further comprising the step of:

combining at least some of the first portion and at least some of the reduced color dairy intermediate to form a first reduced color dairy product; and separating water from the first reduced color dairy product to form a second reduced color dairy product.

20. The method according to claim 19 wherein the step of separating water from the first reduced color dairy product comprises the step of ultrafiltering the first reduced color dairy product, the method further comprising the step of drying the second reduced color dairy product.

21. A method of processing a dairy material, the dairy material comprising a coloring agent and native and soluble protein, the method comprising the step of:
processing the dairy material in a microfilter;
recovering a permeate from the microfilter, the permeate comprising at least some of the native and soluble protein from the dairy material;
recovering a retentate from the microfilter, the retentate comprising at least some of the coloring agent from the dairy material; and
processing the retentate to partially or fully deactivate at least some of the coloring agent in the retentate or to remove at least some of the coloring agent from the retentate.

22. The method according to claim 21 wherein the permeate contains at least about 30% by weight, as determined by high pressure liquid chromatography at a detection wavelength of 280 nanometers, of the native and soluble protein from the dairy material.

23. The method according to claim 21 wherein the permeate contains at least about 60% by weight, as determined by high pressure liquid chromatography at a detection wavelength of 280 nanometers, of the native and soluble protein from the dairy material.

24. The method according to claim 21 wherein the retentate contains at least about 80 percent, by weight, of the coloring agent from the dairy material.

25. The method according to claim 21 wherein the coloring agent is an annatto extract.

26. The method according to claim 21 wherein the step of processing the retentate to partially or fully deactivate at least some of the coloring agent comprises the step of:
blending the retentate with a bleaching agent, the bleaching agent capable of at least partially oxidizing at least some of the coloring agent.

27. The method according to claim 26 wherein the bleaching agent comprises benzoyl peroxide, hydrogen peroxide, ozone or any combination of any of these.

28. The method according to claim 21 wherein the step of processing the retentate to partially or fully deactivate at least some of the coloring agent comprises the step of:
partially or fully oxidizing at least some of the coloring agent with a bleaching agent.

29. The method according to claim 21 wherein the step of processing the retentate to partially or fully deactivate at least some of the coloring agent produces a reduced color dairy intermediate, the method further comprising the step of:
combining at least some of the permeate and at least some of the reduced color dairy intermediate to form a reduced color dairy product.

30. The method according to claim 29, wherein the method further comprising the step of drying the reduced color dairy product.

31. The method according to claim 21 wherein the step of processing the retentate to partially or fully deactivate at least some of the coloring agent produces a reduced color dairy intermediate and wherein the reduced color dairy intermediate and the permeate each comprise water, the method further comprising the step of:
combining at least some of the permeate and at least some of the reduced color dairy intermediate to form a first reduced color dairy product; and
separating water from the first reduced color dairy product to form a second reduced color dairy product.

32. The method according to claim 31 wherein the step of separating water fro m the first reduced color dairy product comprises the step of ultrafiltering the first reduced color dairy product, the method further comprising the step of drying the second reduced color dairy product.

33. A method of processing a dairy material, the dairy material comprising a coloring agent and soluble protein and a processed form of the dairy material having an L* value, an a* value, and a b* value, the method comprising the steps of:
separating the dairy material into a first portion and a second portion, the first portion comprising soluble protein from the dairy material and the second portion comprising coloring agent from the dairy material; and
treating the second portion to modify or remove at least some of the coloring agent and form a third portion, the third portion having at least an L* value that is greater than the L* value of the processed form of the dairy material, an a* value that is nearer to zero than the a* value of the processed form of the dairy material, or a b* value that is closer to zero than the b* value of the processed form of the dairy material.

34. The method according to claim 33 wherein the dairy material comprises a whey material.

35. The method according to claim 33, wherein the method further comprising the step of:
combining soluble protein and at least part of the third portion to form a reduced color dairy product.

36. The method according to claim 35 wherein a spray dried form of the dairy material has a moisture content of less than about 5 weight percent and the spray dried form of the dairy material having at least an L* value outside the range of about +84 to about +100, an a* value outside the range of about 0 to about −2, or a b* value outside the range of about +16 to about +6, the method further comprising the step of:
drying the reduced color dairy product to form a dried reduced color dairy product having a moisture content of less than about 5 weight percent, the dried reduced color dairy product having an L* value in the range of about +84 to about +100, an a*value in the range of about 0 to about −2, and a b* value in the range of about +16 to about +6.

37. The method according to claim 35 wherein the step of combining soluble protein and at least part of the third portion to form a reduced color dairy product comprises the step of combining at least part of the first portion with at least part of the third portion to form the reduced color dairy product.

38. The method according to claim 35, wherein the method further comprising the step of:
drying the reduced color dairy product to a moisture level of less than about 5 weight percent; and
mixing the dried reduced color dairy product with water to form a reconstituted reduced color dairy product, the reconstituted reduced color dairy product having an a* value in the range of about −5 to about +2 or a b* value in the range of about +22 to about +5.

39. The method according to claim 38 wherein the reconstituted reduced color dairy product has an a* value in the range of about −5 to about +2 and a b* value in the range of about +22 to about +5.

40. The method according to claim 38 wherein the reconstituted reduced color dairy product comprises about 10 weight percent of the dried reduced color dairy product and about 90 weight percent water.

41. The method according to claim 35 wherein the reduced color dairy product, when dried to a moisture level of less than about 5 weight percent and subsequently reconstituted, with water in the weight ratio of about 10 parts dried reduced color dairy product to about 90 parts water, has an a* value in the range of about −5 to about +2 or a b* value in the range of about +22 to about +5.

* * * * *